US008641515B2

(12) United States Patent
Nicely et al.

(10) Patent No.: US 8,641,515 B2
(45) Date of Patent: Feb. 4, 2014

(54) GAMING SYSTEM AND METHOD FOR PROVIDING AUTOMATED CASINO-STYLE TABLE TOURNAMENTS

(75) Inventors: Mark C. Nicely, Daly City, CA (US); Timothy B. Richards, Henderson, NV (US); Anthony J. Baerlocher, Reno, NV (US)

(73) Assignee: IGT, Las Vegas, NM (US)

( * ) Notice: Subject to any disclaimer, the term of this patent is extended or adjusted under 35 U.S.C. 154(b) by 1478 days.

(21) Appl. No.: 12/116,718

(22) Filed: May 7, 2008

(65) Prior Publication Data

US 2009/0280904 A1 Nov. 12, 2009

(51) Int. Cl.
*A63F 13/10* (2006.01)
*A63F 13/12* (2006.01)
*G07F 17/32* (2006.01)

(52) U.S. Cl.
CPC .......... *G07F 17/3276* (2013.01); *G07F 17/323* (2013.01)
USPC .............................................. 463/25; 463/42

(58) Field of Classification Search
CPC ............ G07F 17/3276; G07F 17/3244; G07F 17/323; G07F 17/3211
USPC ............. 463/16, 20, 5, 26–29, 30, 31, 40–42, 463/11–13, 17–19, 43
See application file for complete search history.

(56) References Cited

U.S. PATENT DOCUMENTS 5,083,271 A * 1/1992 Thacher et al. ................. 700/92
6,375,569 B1 * 4/2002 Acres .............................. 463/27
7,684,874 B2 3/2010 Schlottmann et al.
7,684,882 B2 3/2010 Baerlocher et al.
7,689,302 B2 3/2010 Schlottmann et al.
7,787,972 B2 8/2010 Schlottmann et al.
8,070,583 B2 12/2011 Baerlocher et al.
2001/0019965 A1 * 9/2001 Ochi ............................... 463/25
2001/0031659 A1 * 10/2001 Perrie et al. ..................... 463/18
2002/0042298 A1 * 4/2002 Soltys et al. .................... 463/29
2002/0183105 A1 * 12/2002 Cannon et al. .................. 463/16
2003/0070178 A1 * 4/2003 Boyd et al. .................... 725/110
2005/0003878 A1 * 1/2005 Updike ........................... 463/16
2007/0090599 A1 * 4/2007 Hamilton ...................... 273/292
2007/0259709 A1 * 11/2007 Kelly et al. ..................... 463/20
2007/0293293 A1 12/2007 Baerlocher et al.
2007/0298857 A1 12/2007 Schlottmann et al.
2008/0045344 A1 2/2008 Schlottmann et al.

(Continued)

OTHER PUBLICATIONS

"Scarne's Encyclopedia of Card Games," by John Scarne, 1973, HarperCollins, chapters on poker.*

*Primary Examiner* — David L Lewis
*Assistant Examiner* — Matthew D. Hoel
(74) *Attorney, Agent, or Firm* — Neal, Gerber & Eisenberg LLP

(57) ABSTRACT

A gaming system and method that enables players to sequentially wager in a casino-style table tournament on gaming machines. The gaming system provides real-time wagering information and bankroll information of each player to the other players of the tournament so that players may determine their wagers based on what other players wager. The gaming system enables players to make one or more secret wagers during the tournament that are not immediately indicated or displayed to other players to try to gain an advantage in the tournament. All normal wagers are displayed to the players in real-time but the secret wagers are not displayed to players until after the close of wagering creating excitement in the tournament.

48 Claims, 23 Drawing Sheets

(56) References Cited

U.S. PATENT DOCUMENTS

| | | | |
|---|---|---|---|
| 2008/0064502 | A1 | 3/2008 | Schlottmann et al. |
| 2008/0070680 | A1 | 3/2008 | Baerlocher et al. |
| 2008/0070692 | A1 | 3/2008 | Schlottmann et al. |
| 2008/0070693 | A1 | 3/2008 | Schlottmann et al. |
| 2008/0070694 | A1 | 3/2008 | Schlottmann et al. |
| 2008/0070695 | A1 | 3/2008 | Baerlocher et al. |

* cited by examiner

| Number Covered | Amount Wagered | Potential Return | Potential Rank |
|---|---|---|---|
| 3 | 10.00 | 360.00 | 1 |
| 7 | 10.00 | 144.00 | 3 |
| 8 | 9.00 | 108.00 | 3 |
| 10 | 8.00 | 72.00 | 5 |
| 11 | 8.00 | 72.00 | 5 |
| 26 | 2.00 | 54.00 | 7 |
| 29 | 1.00 | 18.00 | 10 |

GAMING SYSTEM AND METHOD FOR PROVIDING AUTOMATED CASINO-STYLE TABLE TOURNAMENTS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Many casinos offer tournaments to attract players. One common tournament is a parallel slot tournament. In a typical parallel slot tournament, the casino designates certain slot gaming machines for play of the tournament. Casinos readily implement slot tournaments because it is relatively easy to track each player's play on the slot gaming machines and to determine the tournament winner(s). In many slot tournaments, the players play as fast as possible to try to win the most credits in a limited time period. In many parallel slot tournaments, players do not view the tournament play of other players. The gaming system automatically calculates the number of credits that each player wins during the slot tournament.

Another known type of tournament is a sequential casino-style table game tournament. In a sequential type of tournament, players take turns placing their respective wagers. This round-robin betting enables players who bet later to potentially take advantage of the knowledge of bets placed by earlier players. The order of player betting may change for each game of the tournament.

It is more difficult for a casino to implement certain types of casino-style table tournaments such as a craps tournament or a roulette tournament due to a variety of factors. One factor is that the game rules for tournament play are usually more complex than for standard play. Another factor is that the game has to be monitored by human dealers which are subject to make mistakes. For example, mistakes are more likely to occur as the tournament progresses and bet limits increase because the number of chips that a dealer must typically handle becomes very large. The larger number of chips can be time consuming for the dealer to count and distribute and more likely to result in mistakes in counting and distributing the chips. Another factor is that the large bankrolls of the players become more difficult and time consuming to count and publicize after each game or after each round of the tournament. Another difficulty with casino-style tournaments is that managing a tournament's bet limit and the orders in which players bet are relatively complex tasks and may be prone to error when completed by one or more dealers during a tournament. These difficulties sometimes require additional dealer training and additional deals which adds significant costs to running such tournaments. A further challenge is that large gaming tables and large numbers of gaming tables cause greater physical disbursement across the casino floor making central communication more difficult.

Certain types of sequential casino-style tournaments can also be more difficult for players to play. Typically, the players are each given a designated color of chips. When it is a player's turn to wager, the player must try to determine what the other players wagered by viewing which chips are wagered on the table. It can be difficult for a wagering player to track other players' previous wagers to determine what to wager. That is, the large numbers of chips also make it more difficult for players to track the wagering of the other players.

In certain casino-style tournaments, the players may make secret wagers. When it is time for a player to wager, if the player has a secret wager opportunity, this player can write down their type and amount of their wager instead of doing so publicly. The details of any secret wagers are only revealed after all players have completed their wagering for the given game or alternately, after the outcome of the game is finalized. The other players therefore see that the player is making an extra wager, but the amount of the wager and what the wager is on is secret from the other players. It is difficult to hide the act of making a secret wager. A player may benefit by making a secret wager by preventing subsequent players from potentially being able to take advantage of the knowledge of the specifics of the secret wager. Typically, in a game with secret betting, each player will have the ability to exercise one secret bet during each round of play.

Accordingly, there is for casino-style tournament systems which reduce or eliminate the above problems or drawbacks.

SUMMARY

The present disclosure generally relates to casino-style tournament systems. In various embodiments, the present disclosure provides a gaming system including a central server operable to communicate a plurality of different instructions to a plurality of gaming devices or consoles to provide non-tournament game play and to simultaneously provide casino-style tournament game play on the same gaming devices or consoles. That is, in certain embodiments, the gaming system enables players to sequentially wager in sequential casino-style tournaments on gaming devices or consoles and to play non-tournament games on their gaming devices or consoles while they are playing the casino-style tournament. In certain embodiments, the gaming system provides real-time wagering information and actual bankroll information or potential bankroll information of each player to the other players of the casino-style tournament so that players may better determine their wagers based on what other earlier betting players wager.

More specifically, the gaming system includes a plurality of gaming devices such as stand alone gaming devices, table top gaming devices or consoles, or hand held gaming devices that enable players to play a casino-style tournament, such as a craps, roulette or baccarat tournament. The gaming devices may be arranged around a table or in a specific area of the gaming establishment or the gaming devices may be placed throughout one or more gaming establishments. Multiple tournaments may be linked across a single gaming establishment or multiple gaming establishments. A gaming establishment operator configures the casino-style tournament. The gaming system invites players to the casino-style tournament and enables the players to register for the tournament.

At a designated tournament time, the gaming system provides each of the players a designated number of tournament credits or virtual tournament chips. The gaming system assigns each of the players to a group for the casino-style tournament and determines a player from each group to begin the sequential wagering for that group. For example, when the gaming devices are arranged around different tables, the players are grouped by table. For each game of each group, the gaming system enables the determined player to wager on a tournament game and enables each of the other players to sequentially wager on that tournament game. The player that begins wagering may be determined for each game of the tournament round or may follow a predetermined order (e.g., player 1 wagers first for the first game and player 2 wagers first for the second game). The gaming system provides players real time results of the players' wagers so that other players may determine the amount to wager based on other prior players' wagers. In one embodiment, the gaming system provides the potential range of a given player's bankroll relative to that player's current wager before the corresponding game outcome has been determined. At the end of each tournament game, the gaming system provides the players results and standings and indicates a player in each group to begin the sequential wagering. Each round may include any suitable number of games. After the round, the gaming system enables a plurality of players to advance to the next round of the casino-style tournament. A plurality of players advance to a final round which determines one or more tournament winners.

The present disclosure contemplates different variations of the casino-style tournament. In various embodiments, the gaming system provides the players real time bankroll information and personalized messaging for the casino-style tournament. For example, the gaming system updates the bankroll of each player after each wager so that each player may easily calculate their wager based on the prior placed wagers for that game without having to calculate the wagers of other players to determine their wager. In another embodiment, the gaming system personally messages players when it is their turn to wager.

In one embodiment, the gaming system enables players to make secret bets or wagers. Unlike normal tournament bets or wagers, these secret bets or wagers are not displayed to other players during the sequential casino-style tournament game prior to every player in the group completing their betting. That is, these secret wagers are not immediately displayed to other players which prevents subsequent bettors from being able to obtain any advantage based on the knowledge of the player's wager. Additionally, in some embodiments, other players are given no indication that a player has placed a secret wager in addition to a public wager. That is, the gaming system enables players to make an additional secret wager on their gaming machines without providing any indication to any of the other players at their table that they are making a secret wager. All normal wagers are displayed to the players in real-time but the secret wagers are not displayed to players until after the close of wagering to add to the excitement in the casino-style tournament. In one embodiment, the secret wager is not revealed until after the game outcome has been generated.

In various embodiments, the gaming system enables players to play one or a plurality of different wagering games while they are playing the casino-style tournament. For example, the gaming system enables the player to play a side game of blackjack using non-tournament credits for real money while other players are placing their tournament wagers for a tournament game. The ability to play other wagering games for the player provides the players the ability to win additional games while they are playing the tournament.

In various embodiments, the gaming system enables players to wager on the casino-style tournament. In one embodiment, the gaming system enables tournament players to wager tournament credits on the results of the casino-style tournament or on a game or round of the tournament. In one embodiment, the gaming system enables the player to wager tournament credits on that tournament game outcome and/or wager non-tournament credits on that tournament game outcome and wager non-tournament credits on wagering, non-tournament games. Therefore, during a single round of a casino-style tournament, the gaming system enables a tournament player to place a plurality of wagers using tournament and non-tournament credits. In these embodiments, while the player may lose tournament credits in a tournament game, the player may win non-tournament credits at the same time. Therefore, a player may cautiously avoid losing all of the tournament and non-tournament credits wagered. For example, if the game is roulette, the player may wager tournament credits on red and non-tournament credits on black. Therefore, the likelihood of the player winning one of those wagers is very high. In different embodiments, the gaming system may enable tournament players to wager tournament or non-tournament credits on the results of the casino-style tournament, a game outcome of the casino-style tournament, on another player's wager on the casino-style tournament, and/or on a round outcome of the casino-style tournament.

In different embodiments, certain games or rounds of the tournament may include betting minimums and maximums. In one embodiment, non-secret tournament wagers are subject to a minimum and maximum but secret tournament wagers are not subject to a minimum and maximum. In another embodiment, non-secret tournament wagers are not subject to a minimum and maximum but secret tournament wagers are subject to a minimum and maximum. In another embodiment, all wagers made with tournament credits are subject to a minimum and maximum but non-tournament wagers placed on one or more aspects of the tournament are not subject to minimums and maximums.

In another embodiment, the gaming system enables non-tournament players to wager non-tournament credits on the one or more results or aspects of a casino-style tournament. In one embodiment, the gaming system enables non-tournament players to wager non-tournament credits on a tournament game outcome. In one embodiment, the gaming system enables non-tournament players to wager non-tournament credits on a tournament player's wager in a game of a tournament. In one embodiment, the gaming system enables non-tournament players to wager non-tournament credits on a one or more round winners of a tournament. In one embodiment, the gaming system enables non-tournament players to wager non-tournament credits on the winner of a tournament.

Accordingly, it should be appreciated that the gaming system provides an automated sequential casino-style tournament enabling a gaming establishment to provide a tournament with less personnel and an automated wagering system providing real-time tournament information to players. In one embodiment, the gaming system enables a plurality of players to sequentially wager on a tournament game and to base their wagers on wagers of prior players for that game that are displayed to the tournament players. In one embodiment, the gaming system also enables players to make secret or undisclosed wagers that are not indicated or displayed to other players until after wagering for a game is closed to try to gain an advantage in the game. Additionally, the gaming system enables the tournament players to play non-tournament games while they are playing the tournament. In one embodiment, the gaming system also enables tournament players to wager on one or more aspects of the tournament with tournament or non-tournament credits. In another embodiment, the gaming system also enables non-tournament players to wager on one or more aspects of the tournament with non-tournament credits.

Additional features and advantages are described herein, and will be apparent from, the following Detailed Description and the figures.

DETAILED DESCRIPTION

The present disclosure may be implemented in various configurations for gaming machines, gaming devices, or gaming systems, including but not limited to: (1) a dedicated gaming machine, gaming device, or gaming systems wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a “thin client” embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a “thick client” embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
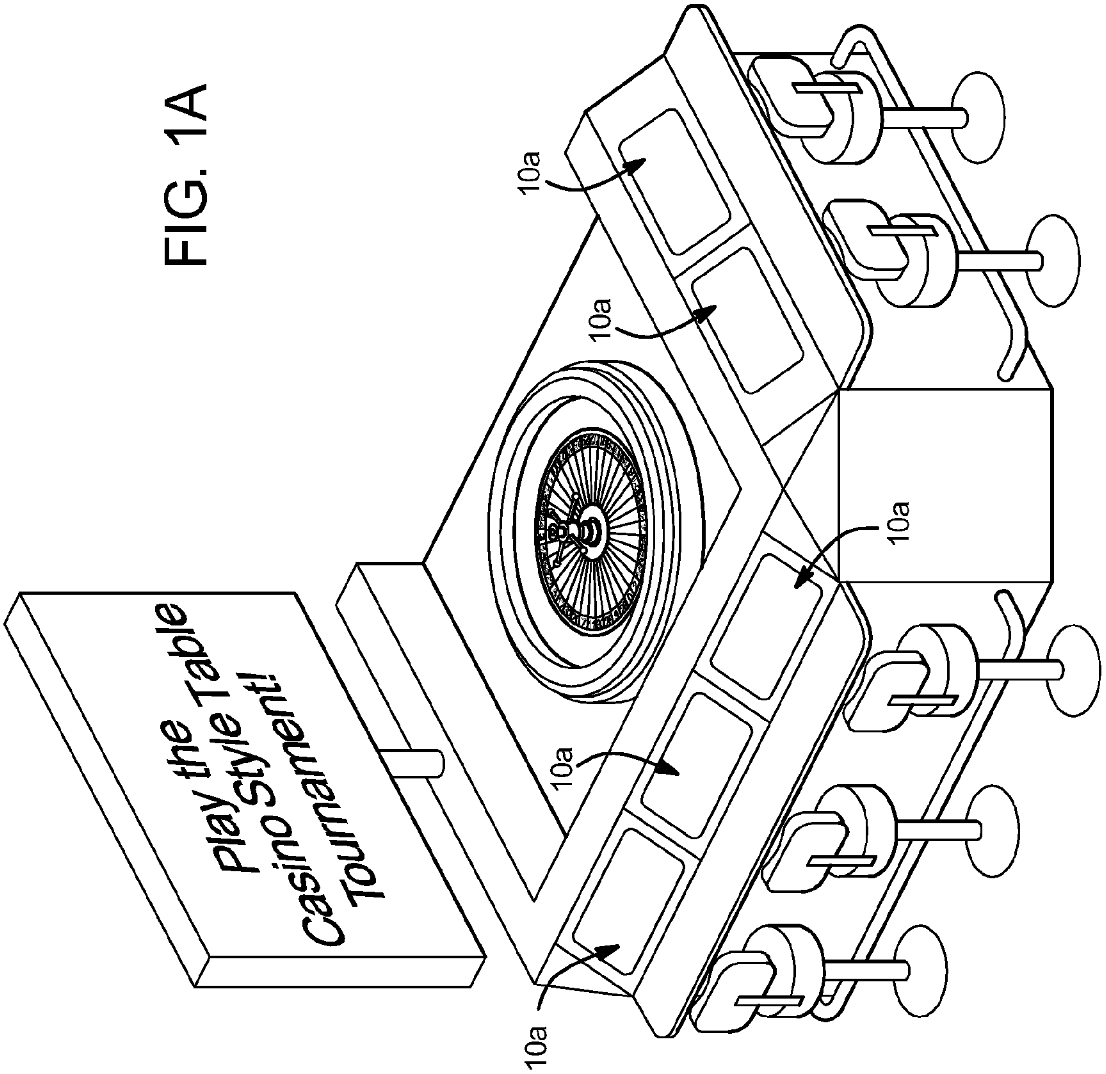
FIGS. 1A and 1B are diagrammatic front perspective views of alternative embodiments of gaming systems disclosed herein.
Figure 1B:
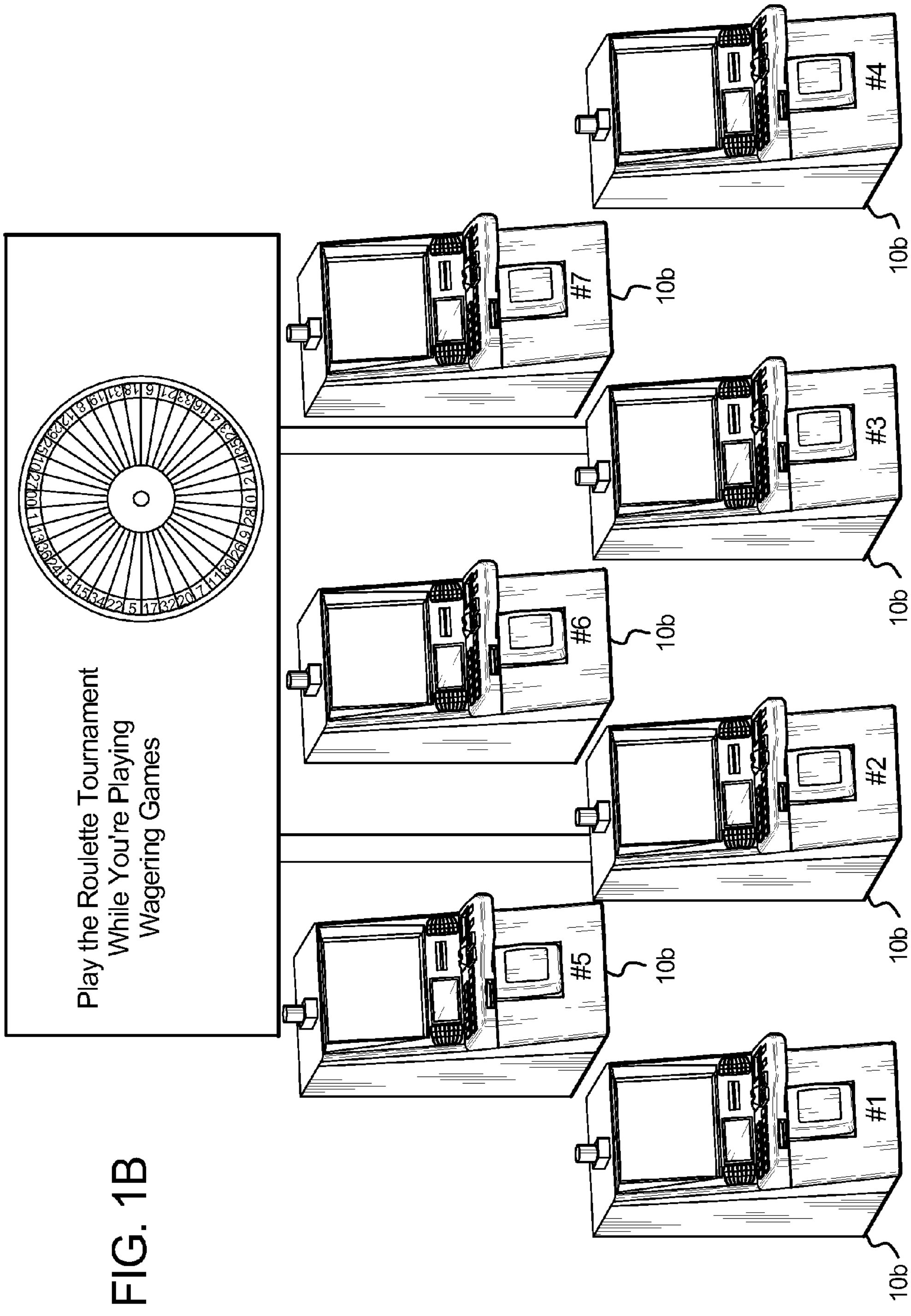
Figure 2A:
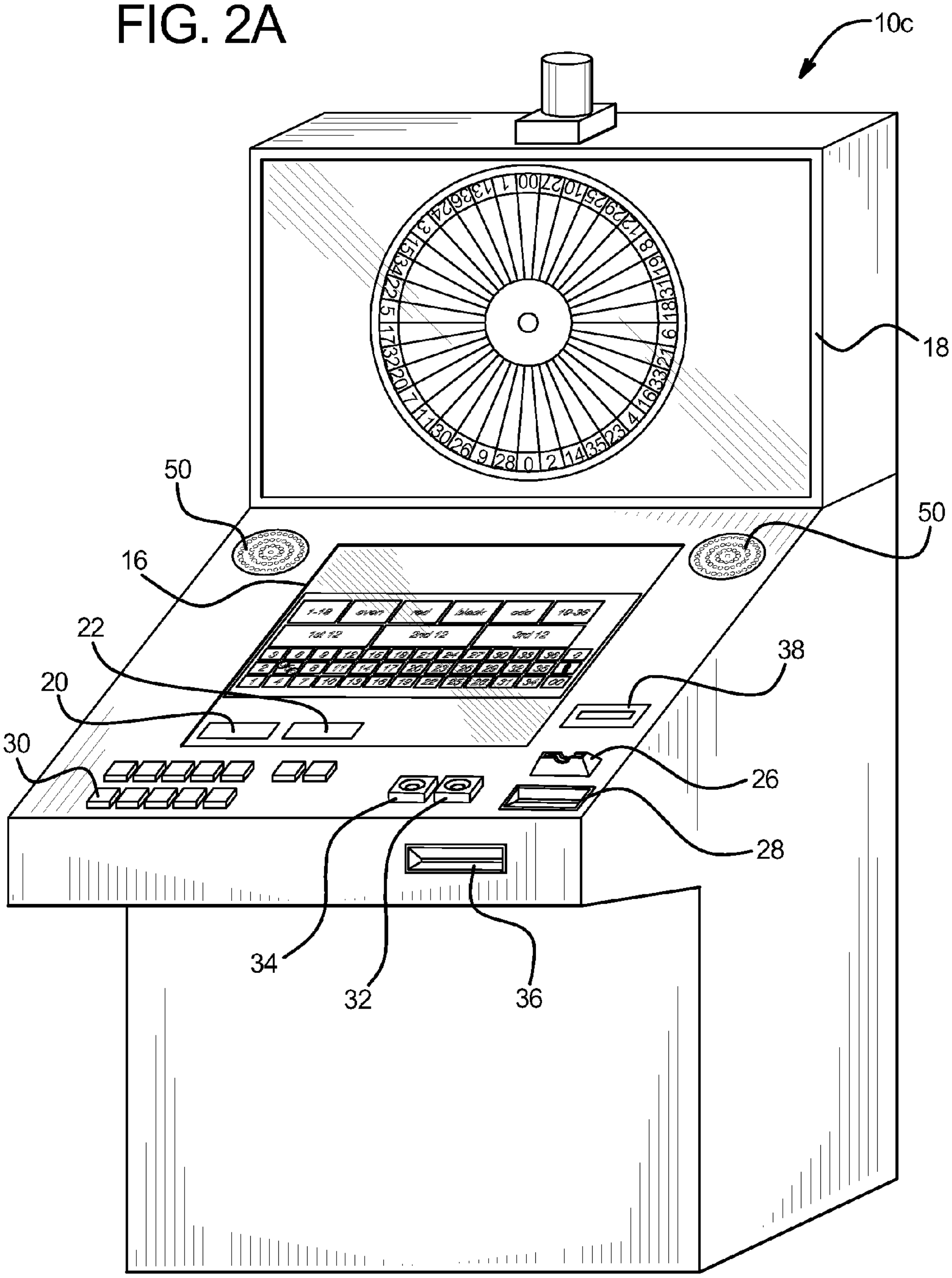
FIGS. 2A, 2B and 2C are diagrammatic front perspective views of alternative embodiments of gaming devices disclosed herein.
Figure 2B:
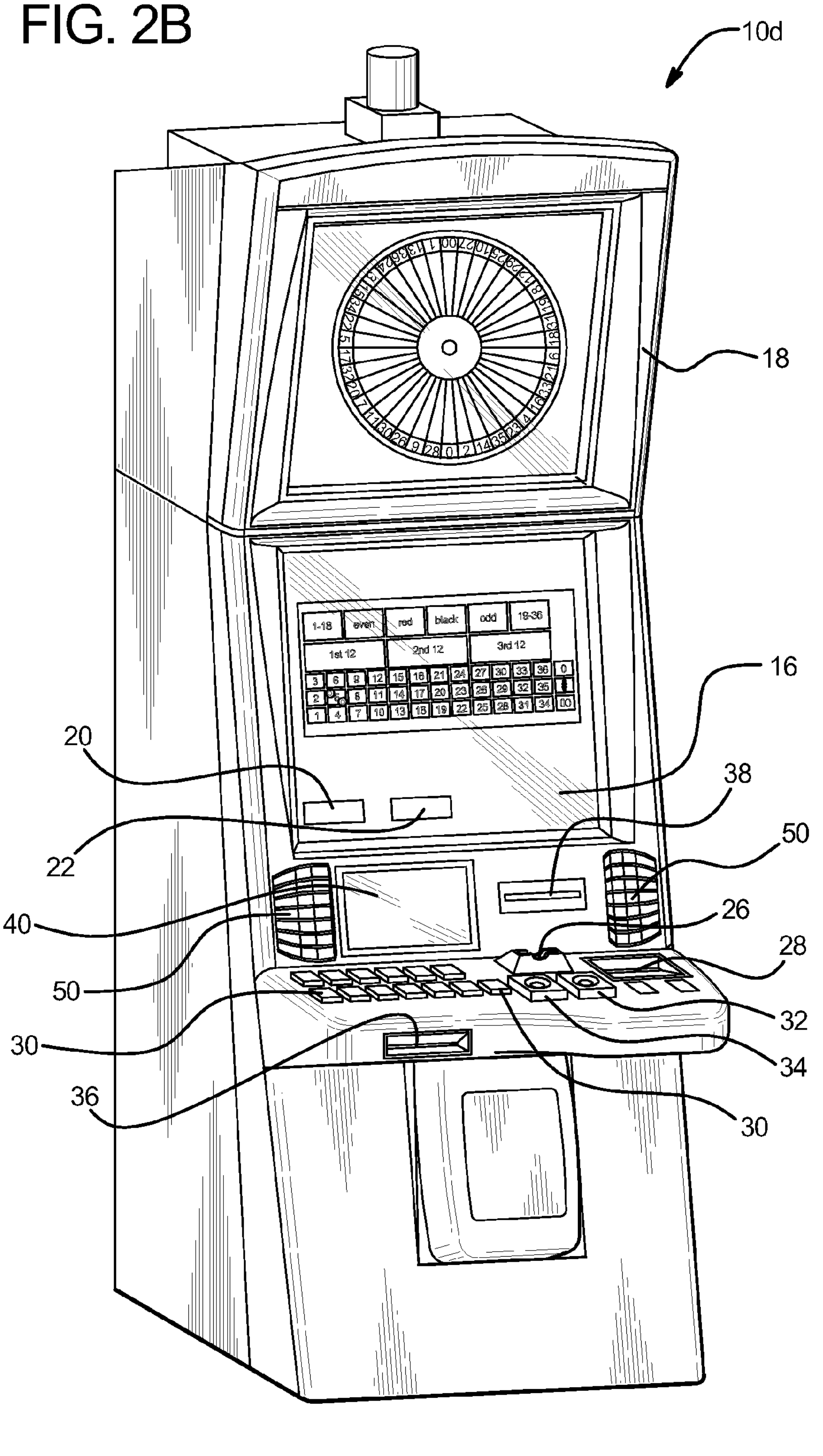
Figure 2C:
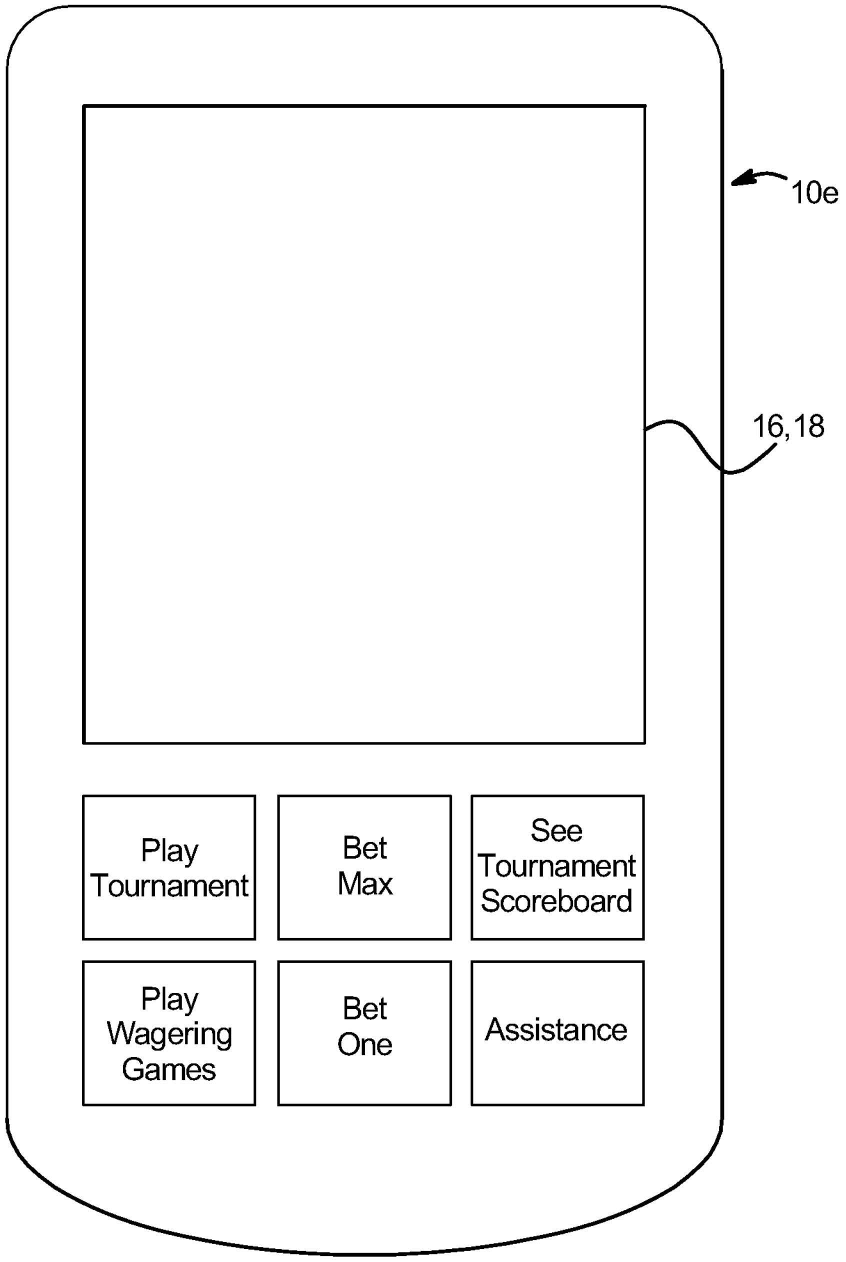

Referring now to the drawings, FIGS. 1A and 1B illustrate casino-style tournament systems which include a plurality of gaming devices 10*a* and 10*b*, respectively. It should be appreciated that the gaming devices may be any suitable types of gaming devices. In these illustrated embodiments, the gaming devices are grouped together. FIGS. 2A, 2B, and 2C illustrate three example alternative embodiments of a gaming device are illustrated as gaming device 10*c*, gaming device 10*d* and gaming device 10*e*, respectively. Gaming device 10*a* and/or gaming device 10*b* and/or 10*c* and/or gaming device 10*d* and/or gaming device 10*d* are generally referred to herein as gaming device 10.

The present disclosure may be implemented in any suitable configurations for gaming machines, gaming devices, gaming tables or gaming systems. The gaming system may include one or more physical gaming tables as illustrated in FIGS. 1A and 1B. In certain embodiments, the gaming system includes virtual table games, such as a roulette game or a craps game displayed on video display. The tournament games may be administered by a dealer which can be a human dealer, a human dealer operating in a casino, a feed or transmission of a video of a dealer operating in a live game, through a real-time video feed of a live casino game, a computerized dealer, a virtual dealer of a casino, a gaming device, a gaming establishment, or a game system provided through a data network such as the Internet. Systems such as those disclosed in patent application Ser. Nos. 11/558,777, 11/609,173, 11/609,149, and 11/119,997 may be employed with the present disclosure.

In one roulette embodiment, the gaming system and method includes a spinning wheel or rotor and a wagering system operable for play of a roulette game. Each of the players may have an individual device that enables them to place wagers or a table may have a community device enabling the players to place wagers. Once the wagers are placed, in one embodiment, the dealer spins a rotor of the roulette wheel in one direction. In another embodiment, the gaming system automatically spins the rotor in one direction. Then the dealer or the gaming system launches a ball onto the rotor, typically in the opposite direction. The rotor has a plurality of pockets or landings. The bet outcomes for the roulette game are based on which landing is the stopping place or receiver for the ball.

It should be appreciated that the gaming machines or gaming stations may be of any suitable configuration and a single tournament may include multiple configurations. For example, the gaming machines may be stand alone gaming machines, banked gaming machines, gaming machines at tables and/or gaming tablets. It should be appreciated that the gaming system may enable the players to place bets or participate in the tournament through hand-held devices such as mobile telephones and/or blackberries and/or over the internet.

It should be appreciated that in certain embodiments, the gaming system provides tournament and non-tournament games to the player on the same gaming machines. In one such embodiment, the computerized instructions for controlling any tournament games are executed by at least one central server, central controller, or remote host and the computerized instructions for controlling any non-tournament games are communicated from the central server, central controller, or remote host to a gaming device local processor and memory devices. In another embodiment, the computerized instructions for controlling any non-tournament games are executed by at least one central server, central controller, or remote host and the computerized instructions for controlling any tournament games are communicated from the central server, central controller, or remote host to a gaming device local processor and memory devices. In another embodiment, the computerized instructions for controlling any non-tournament and tournament games are executed by at least one central server, central controller or remote host. In another embodiment, the computerized instructions for controlling any non-tournament and tournament games are communicated from the central server, central controller, or remote host to a gaming device local processor and memory devices.

In the embodiments illustrated in FIGS. 2A and 2B, in one embodiment, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 2A and 2B, the gaming device may have varying cabinet and display configurations.

In another embodiment, the gaming device or gaming machine disclosed herein is operable over a wireless network, such as part of a wireless gaming system to communicate with the central server. As illustrated in FIG. 2C, in one such embodiment, the gaming machine may be a hand held device, such as a cell phone, a smart phone or a PDA, a mobile device or any other suitable wireless device that enables a player to play any tournament game or any suitable wagering game at a variety of different locations. In one embodiment, the hand held device enables a player to purchase a set number of games, wherein the purchased games are loaded, such as downloaded, onto the hand held device. In another such embodiment, the hand held device enables a player to purchase each game individually in real-time based on a connection to the central server. In these embodiments, as each game is played, an outcome is generated and one or more bonus awards may be provided to the player.

Figure 3A:
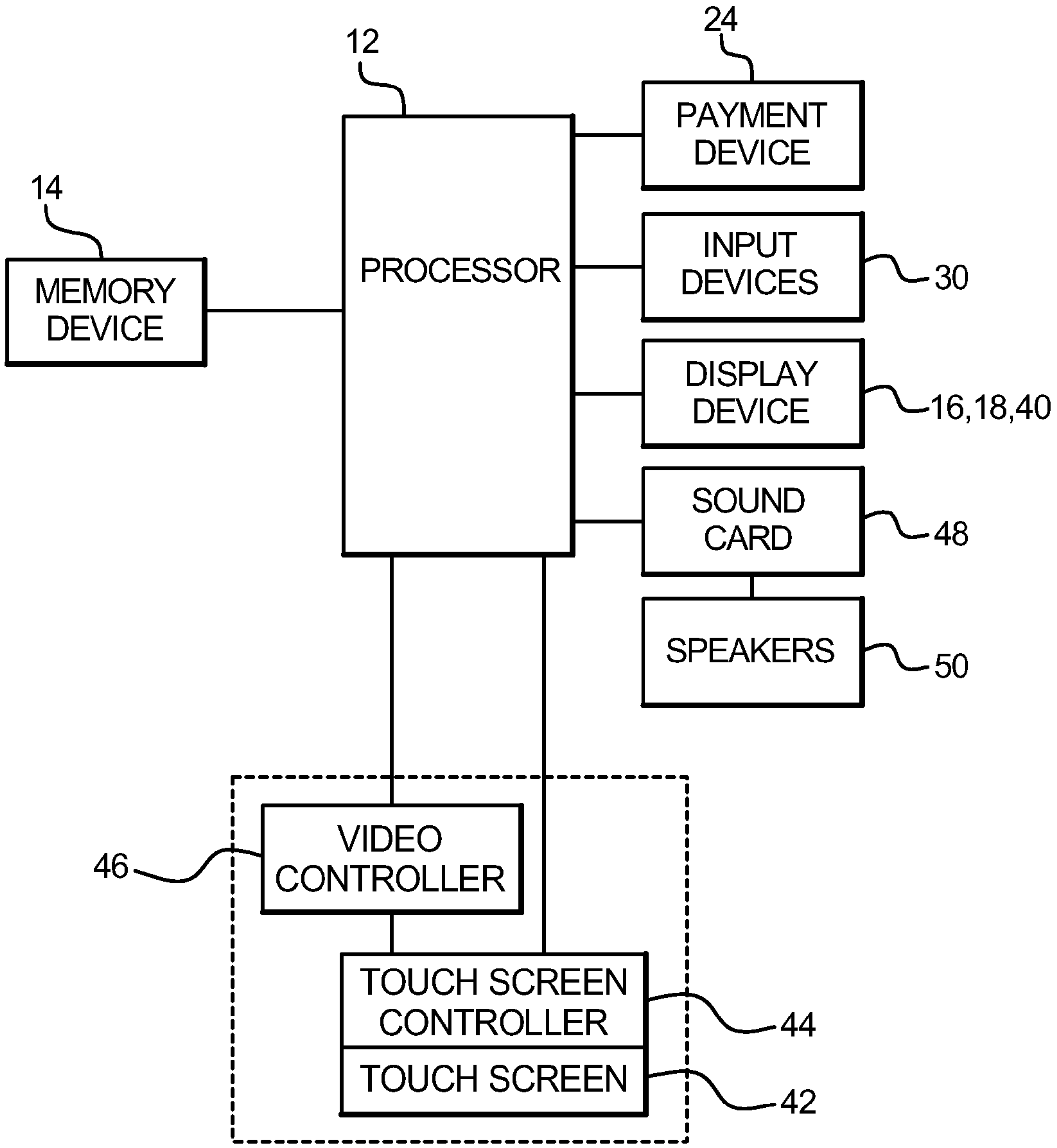
FIG. 3A is a schematic block diagram of the electronic configuration of one embodiment of a gaming device disclosed herein.

In one embodiment, as illustrated in FIG. 3A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming system randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming system generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming system employs a predetermined or finite set or pool of awards or other game outcomes. In this embodiment, as each award or other game outcome is provided to the player, the gaming system flags or removes the provided award or other game outcome from the predetermined set or pool. Once flagged or removed from the set or pool, the specific provided award or other game outcome from that specific pool cannot be provided to the player again. This type of gaming system provides players with all of the available awards or other game outcomes over the course of the play cycle and guarantees the amount of actual wins and losses.

In another embodiment, as discussed below, upon a player initiating game play at the gaming device, the gaming device enrolls in a bingo game for a play of one or more non-tournament games. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 3A, the gaming device includes one or more display devices controlled by the processor. The display devices are preferably connected to or mounted on the cabinet of the gaming device. The embodiment shown in FIG. 2A includes a central display device 16 which displays a tournament betting display but may in different embodiments display a non-tournament primary game and a secondary display device 18 that displays the tournament table game. This display device may also display any suitable secondary game associated with a tournament game or a non-tournament primary game as well as information relating to a tournament game or non-tournament primary or secondary game. An alternative embodiment shown in FIG. 2B includes a central display device 16 and an upper display device 18. The upper display device may display any tournament game or non-tournament primary game, any suitable non-tournament secondary game associated or not associated with the non-tournament primary game and/or information relating to the tournament and/or non-tournament primary or secondary game. Another alternative embodiment shown in FIG. 2C includes a single display device 16, 18. These display devices may also serve as digital glass operable to advertise games or other aspects of the gaming establishment. As seen in FIGS. 2A and 2B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

As illustrated in FIG. 3A, in one embodiment, the gaming device includes at least one payment device 24 in communication with the processor. As seen in FIGS. 3A, 2A and 2B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data), and other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 3A, 2A and 2B, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card, may be implemented in accordance with the gaming device disclosed herein.

In one embodiment, as mentioned above and as seen in FIG. 3A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 3A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering or non-tournament game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, a non-tournament base or primary game may be a slot game with one or more paylines. The paylines may be horizontal, vertical, circular, diagonal, angled or any combination thereof. In this embodiment, the gaming device includes at least one and preferably a plurality of reels, such as three to five reels, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels are in video form, one or more of the display devices, as described above, displays the plurality of simulated video reels. Each reel displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device or system determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a non-tournament base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the non-tournament base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a non-tournament base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a non-tournament bonus or secondary game or in a non-tournament bonus or secondary round. The non-tournament bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the non-tournament primary game or a particular arrangement of one or more indicia on a display device in the primary game, such as the number seven appearing on three adjacent reels along a payline. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central server 56 randomly provides the player one or more plays of one or more non-tournament secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a non-tournament bonus round after the player has achieved a triggering event or qualifying condition in the non-tournament base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player, for example, if the player has been unsuccessful at qualifying through other specified activities. In one embodiment, a buy in is included in a travel package. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 3B:
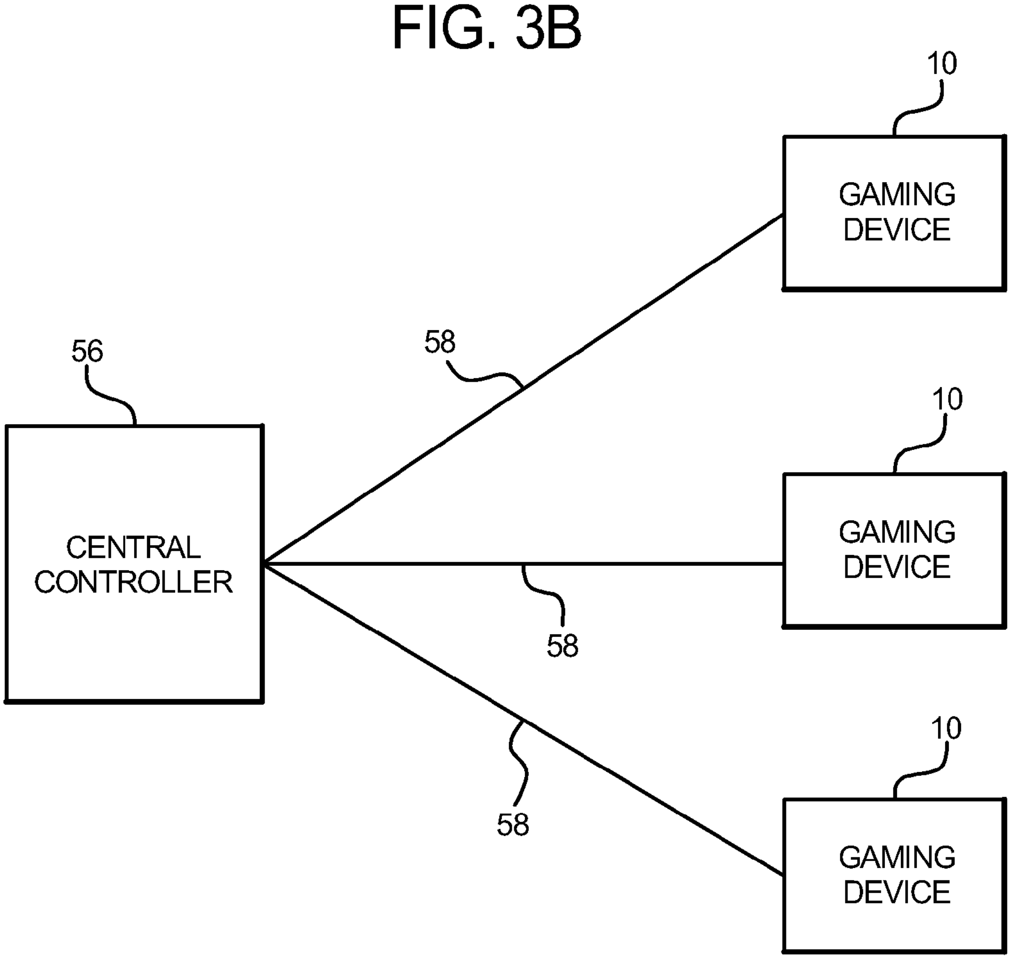
FIG. 3B is a schematic diagram of the central server in communication with a plurality of gaming devices in accordance with one embodiment of the gaming system disclosed herein.

In one embodiment, as illustrated in FIG. 3B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the non-tournament game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the non-tournament primary game based on probability data. In another embodiment, the central server or controller randomly generates a game outcome for the secondary game based on probability data. In another embodiment, the central server or controller randomly generates a game outcome for both the non-tournament primary game and the non-tournament secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided non-tournament game outcome can include a primary game outcome, a secondary game outcome, primary and secondary game outcomes, or a series of game outcomes such as free games.

The central server or controller communicates the generated or selected non-tournament game outcome to the initiated gaming device. The gaming device receives the generated or selected game outcome and provides the game outcome to the player. In an alternative embodiment, how the generated or selected non-tournament game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined non-tournament game outcome value is determined for each of a plurality of linked or networked gaming devices based on the results of a bingo, keno, or lottery game. In this embodiment, each individual gaming device utilizes one or more bingo, keno, or lottery games to determine the predetermined non-tournament game outcome value provided to the player for the interactive game played at that gaming device. In one embodiment, the bingo, keno, or lottery game is displayed to the player. In another embodiment, the bingo, keno, or lottery game is not displayed to the player, but the results of the bingo, keno, or lottery game determine the predetermined game outcome value for the non-tournament primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for non-tournament monitoring purposes only. That is, each individual gaming device randomly generates the non-tournament game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent non-tournament gaming sessions, the player's recent tournament gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another. The WAN enables players at different gaming locations to participate in a same casino-style tournament.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different non-tournament games may include the same or substantially the same game play with different pay tables. In different embodiments, the executable game program is for a non-tournament primary game, a secondary game or both. In another embodiment, the game program may be executable as a non-tournament secondary game to be played simultaneous with the play of a non-tournament primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the non-tournament game or non-tournament type of game played at the gaming device.

In another embodiment, a plurality of gaming devices at one or more gaming sites may be networked to the central server in a progressive configuration, as known in the art, wherein a portion of each wager to initiate a non-tournament base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more non-tournament game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a non-tournament side bet or side wager. In this embodiment, a player must place or wager a side bet to be eligible to win the progressive award associated with the side bet. In one embodiment, the player must place the maximum bet on a non-tournament game and the side bet to be eligible to win one of the progressive awards. In another embodiment, if the player places or wagers the required side bet, the player may wager at any credit amount during the non-tournament primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the non-tournament primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the non-tournament primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Casino-Style Tournaments

Figure 4:
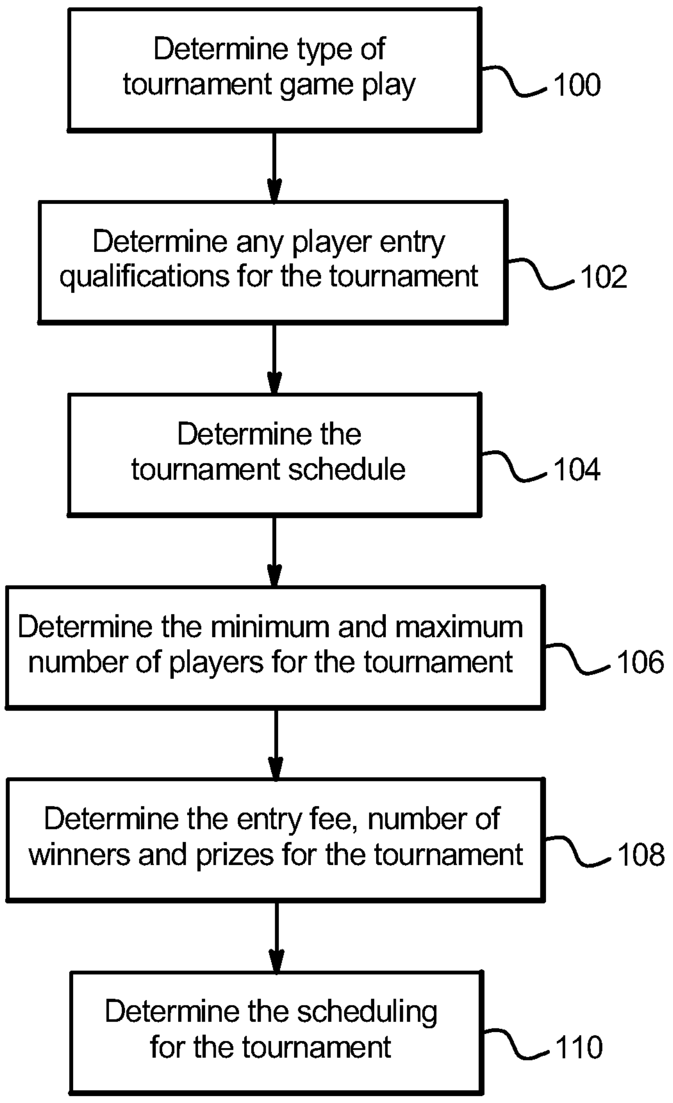
FIG. 4 is a flow chart illustrating one method of one embodiment of tournament configuration.

As illustrated in FIG. 4, in one embodiment, the gaming establishment operator configures or customizes a casino-style tournament. The gaming system enables the gaming establishment operator to retrieve or pull up one or more configurable determined game programs via a central server or controller. For example, if the gaming establishment operator wants to create a new casino-style tournament, the gaming system enables the gaming establishment operator to enter information pertinent to the casino-style tournament, such as a tournament name, a tournament description, location, start date, end date, start time, end time, prize information, the tournament format and any other desired information. The game program further enables the gaming establishment operator to enter input information to further customize the casino-style tournament (such as the number of rounds, rounds per day, the time between different sessions, player qualification information, the actual number of players, buy in information, and any other suitable information). The gaming establishment operator can further integrate the casino-style tournament with different sign messaging systems to keep current players standings up to date. For example, the gaming system may personally message players or potential players or message all players via central displays. In one embodiment, the players may view the displays to continually track tournament progress and scores even if such players are eliminated. In one embodiment, the players may use the gaming machines to continually track tournament progress and scores even if such players are eliminated.

FIG. 4 illustrates one embodiment of a method of configuration of a casino-style tournament of the present disclosure. The gaming system makes decisions of how to run the casino-style tournament based on information input into the gaming system via a game program or via input from a gaming establishment operator. As illustrated in block 100, the gaming system determines the type of casino-style tournament game to play. For example, the tournament game may be a roulette game, a baccarat game, a craps game or any other suitable casino-style tournament game. As illustrated in block 102, the gaming system determines the player entry qualifications for the casino-style tournament. It should be appreciated that any suitable qualifier or qualification or combination of qualifications may be employed to determine eligibility for a tournament player. For example, a method or a characteristic of a player's game play may qualify the player for tournament entry. In one embodiment, the amount a player wagers determines whether the player is qualified for the casino-style tournament. In one embodiment, the wager qualification amount may be measured in any suitable manner. In certain embodiments, the wager qualification amount is determined by the amount a player wagers on a gaming machine or a gaming table such as the player's coin-in or wagers on a single gaming machine or a single gaming table during uninterrupted play. In another embodiment, the wager qualification amount is determined by the amount the player wagers in a gaming system or a gaming establishment in an allotted time period, such as 24 hours. In another embodiment, the wager qualification amount is determined by the amount wagered on particular gaming machines or particular gaming establishments or particular gaming tables. In another embodiment, the tournament qualifier is based on the average wager per game played for that player. For example, the average wager per slot game or the average wager per table game.

In one embodiment, the amount a player wins determines whether the player qualifies for a tournament entry. The qualification win amount may be measured in any suitable manner. In one embodiment, the qualification win amount is determined by the amount a player wins in a single game, such as a slot game or a table game. In another embodiment, the qualification win amount is determined by the amount the player wins in an allotted time period, such as 24 hours. In another embodiment, the qualification win amount is determined by the amount the player wins at a certain type of game for a certain amount of time. For example, the qualification win amount based for a casino-style craps tournament is based on how much a player wins at craps over a single time period of a week.

In one embodiment, the amount of a certain award won by a player or winning a designated jackpot award determines whether the player qualifies for the tournament entry. In one embodiment, winning a designated jackpot qualifies the player for tournament entry. In another type of tournament, winning a certain amount from one or more jackpots qualifies the player for tournament entry. In another embodiment, winning a part of a tournament qualifies the player for one or more tournaments. In another embodiment, placing at a certain rank in one or more tournaments qualifies the player for a certain tournament.

In one embodiment, the total amount lost by a player over a certain period of time determines whether the player qualifies for the tournament. In one embodiment, losing a designated amount of credits qualifies a player for tournament entry. In another type of tournament, losing a designated number of spins or a designated number of games in a row qualifies the player for tournament entry. This creates a type of loser's tournament, providing players incentives to continue playing after hitting a period of bad luck. It should be appreciated that a tournament qualifier may be determined in any suitable manner.

In different casino-style tournaments, playing certain or designated games qualifies the player for entry into the tournament. In one embodiment, achieving a certain game score qualifies the player for tournament entry. In another embodiment, playing a game or playing at a certain table for a certain amount of time qualifies the player for tournament entry. In another embodiment, the gaming system provides the player a tournament entry as a bonus from a gaming device. In another embodiment, a player may win the tournament entry fee when they are not qualified for a tournament, but may then attempt to win the tournament qualification or play a tournament not requiring tournament qualification.

In certain tournaments, the gaming system determines a designated time period that a player can qualify for a casino-style tournament. For example, the gaming system may determine a certain day for the tournament qualification that may be advertised to the players. In one embodiment, the gaming system determines particular days and/or time periods and certain days where one or more player qualifications count or provide of player entry into a tournament.

In one embodiment, the qualifiers are based on one or more characteristics of a player tracking system or through a player card. For example, all players of a certain rank or level qualify to play in the tournament or for tournament entry. In another embodiment, all new members to a player tracking system or to a gaming establishment receive an automatic tournament entry. In another embodiment, on a player's birthday the gaming system and provides the player a tournament entry. In another embodiment, upon a player's anniversary in the player system, the gaming system provides the player a tournament entry.

As illustrated in block 104, the gaming system determines the casino-style tournament schedule. That is, the gaming system determines the date or dates of the tournament. The gaming system determines the start date and the end date. The gaming system determines the number of rounds of the tournament. That is, the gaming system determines the date and time of each round of the tournament. The player may be given a tournament schedule at registration or when they pick up a portable gaming machine. The schedule may include each of the tournament rounds or only the rounds that that individual player is scheduled to participate in.

As illustrated in block 106, the gaming system determines the minimum and maximum number of players for the tournament. For example, the tournament will only proceed if the minimum of 20 players are registered for the tournament. For example, the player may come to a registration desk to register or pay a tournament entry fee. The gaming system may determine a maximum number of players for the casino-style tournament to ensure that each player may play the tournament at the appropriate round time.

As illustrated in block 108, the gaming system determines the entry fee, if any, for the tournament, the number of winners for the tournament and the prizes for the casino-style tournament. In certain tournaments, the gaming system determines the entry fee of the tournament for each player. In one embodiment, the gaming system requires the player to pay a certain amount of money of credits to enter the tournament. It should be appreciated that the entry fee may be any suitable form of payment. In one embodiment, the gaming system requires the player to pay a certain amount of promotional credits which the gaming system funded to enter the tournament. The gaming establishment or affiliates of the gaming establishment may provide players entry into the tournament. In another embodiment, one or more players are not required to pay an entry fee.

It should be appreciated that the gaming system may implement any suitable buy in or entry fee for the tournament in any suitable manner. It should also be appreciated that in one embodiment some players must pay an entry fee while certain other players do not. In one embodiment, the tournament entry fee is based on the player rank in a player tracking system. For example, a player of a platinum rank in a player tracking system does not have to pay an entry fee and a player of a gold rank must use player points to enroll in the tournament. In one embodiment, the entry fee or buy in is not required to be paid in advance of the tournament. Rather, the fees are automatically dedicated from a player's account upon play of the tournament.

It should be appreciated that the prizes for the casino-style tournament may be any suitable prize included but not limited to cash, a physical prize, such as a car or a different type of prize, such as a vacation or a free night at the gaming establishment hotel. In another embodiment, the prize or the award for the casino-style tournament is not disclosed to the player. That is, the players play for a mystery casino-style tournament prize. In another embodiment, the tournament prize amount is a function of the number of tournament entrants or participants.

It should be appreciated that the gaming system may indicate the tournament winner in any suitable manner. In one embodiment, the gaming system auditorily announces one or more tournament winners or tournament round winners. In another embodiment, the gaming system displays one or more tournament winners or tournament round winners.

In one embodiment, each round includes prizes for one or more players. Therefore, the casino-style tournament includes multiple reward levels. An award or prize is awarded to other players in addition to the overall casino-style tournament winner.

In one embodiment, the casino-style tournament is funded by wagers bet in a certain period of time in that gaming establishment. For example, a percentage of wagers placed at a roulette table for a designated time period of hours provides the prize for the roulette tournament. In another embodiment, the tournament is funded through the buy in for the tournament. In another embodiment, the gaming establishment funds the tournament. It should be appreciated that the tournament may be funded in a suitable manner.

As illustrated in block 110, the gaming system determines the scoring for the casino-style tournament. It should be appreciated that the scoring may be any suitable scoring method. In one embodiment, the scoring of the casino-style tournament is based on the person that has the most virtual chips or credits or has the highest value in virtual chips or credits at the end of the tournament. It should be appreciated that the casino-style tournament may be based on any suitable other method of scoring.

Figure 5:
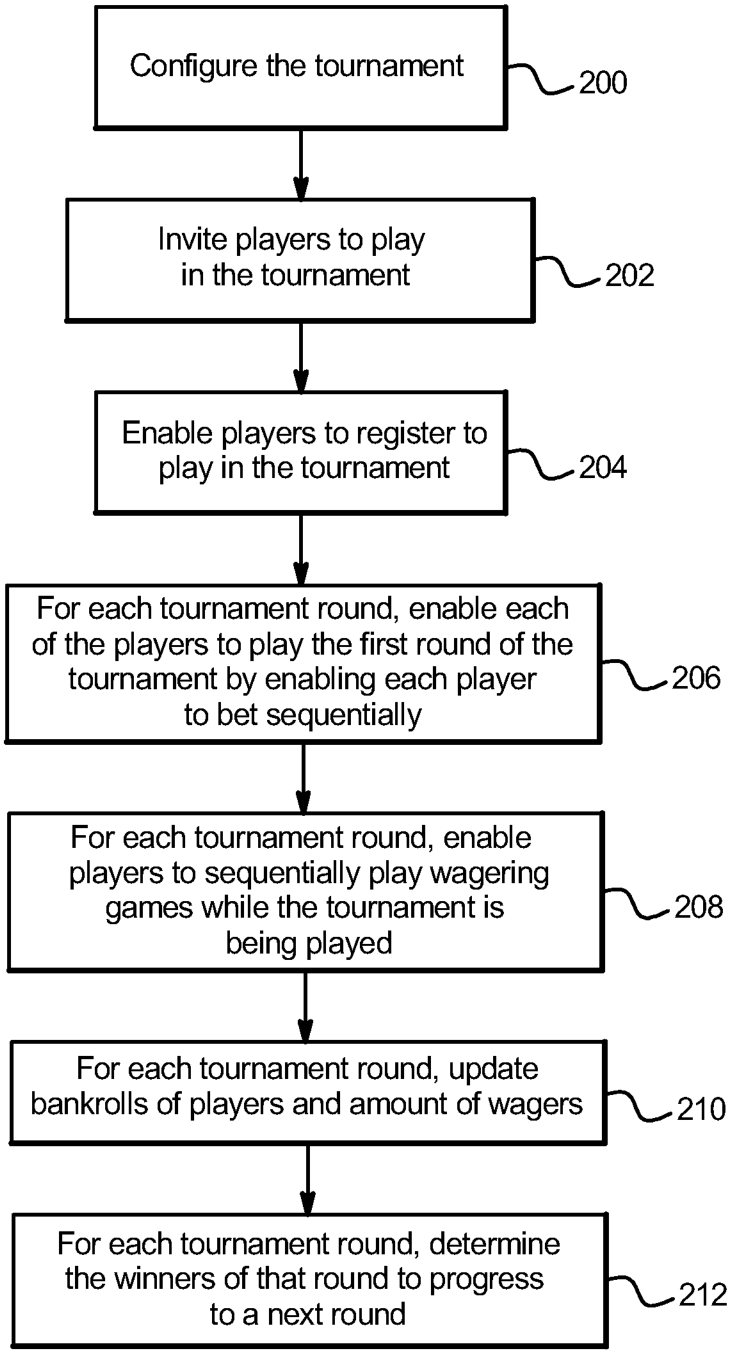
FIG. 5 is a flow chart illustrating one method of one embodiment of a tournament.

FIG. 5 illustrates one method of a tournament. After the casino-style tournament is configured as illustrated in block 200, in one embodiment, the gaming system invites players to play in the casino-style tournament, as illustrated in block 202. The gaming system may determine qualified players by any suitable method. The gaming system enables players to register to play in the casino-style tournament as illustrated in block 204. The gaming system may enable the players to accept the tournament invite or to register for the casino-style tournament via a gaming establishment employee, self-registration at a kiosk or at a gaming machine, the postal mail, the internet, text messaging or in any other suitable manner.

As illustrated in block 206 of FIG. 5, the gaming system enables each of the players to play the first round of the tournament and enables each player to sequentially bet using provided tournament credits or virtual tournament chips. That is, the gaming system enables the first player to bet and then the other players to bet in an orderly fashion. As illustrated in block 208, the gaming system enables players to simultaneously play wagering games while the tournament is being played. For example, after the player makes his or her wager, the player may use the gaming device that the player is playing the tournament on to play a slot game, a blackjack or poker game on the side. Therefore, while the players are wagering and while the tournament outcome is being determined, the players have another activity to occupy their time. As illustrated in block 210, the gaming system updates the bankrolls of the players and the wagers the players place. Therefore, players can strategically see how many credits or virtual chips other players currently have to strategically determine how much they want to wager when it is sequentially their turn.

As each round of the tournament progresses, the gaming system continues to enable the players to bet in a sequential manner where a first player places his or her wagers and then the next player places his or her wagers. In one embodiment, once the player's wager is placed, it cannot be changed. After the tournament activity occurs, such as a roulette wheel spinning or the rolls of dice in craps or the dealing of cards in baccarat, a player begins the sequential wagering process. It should be appreciated that the gaming system may determine any suitable order for each group of players to wager in. In one embodiment, the first player of the current game of the tournament will then be the last player in the next game of the tournament. This sequential order may continue for the duration of the tournament or may change based on different types of games, rounds or for the final round of the tournament. For example, for the final round of the tournament, the order may be based on the number of credits each of the finalists have. After each round of the tournament, a designated number of players from each group of gaming machines or each table will each progress into the next round of the tournament. One or more tournament winners are determined in the final round. In one embodiment, the player with the most credits at the end of the tournament for each group progresses to the next round. The number of players who progress to the next round of the tournament may depend on the number of players playing, and configuration of the tournament.

It should be appreciated that in different embodiments the gaming system will broadcast the real time betting information in any suitable manner. For example, the real time betting information of the players bankroll may be broadcast on each player's gaming device or on a secondary display device on each player's gaming device. In one embodiment, the real time bankrolls of each player's bets are broadcast on one or more commonly shared display device. It should be appreciated that this display system may include any suitable tournament information. For example, the gaming system may also display the potential range that each players bankroll can be after the next tournament game relative to that player's actual bet. The display of the competitor bankrolls may also include the range of possible bankrolls relative to current active wagers. That is, the gaming system displays possible results of the players' wagers before the tournament game outcome is determined. Therefore, each player in the tournament may make an educated decision on how much to wager to try to win the tournament.

Figure 6A:
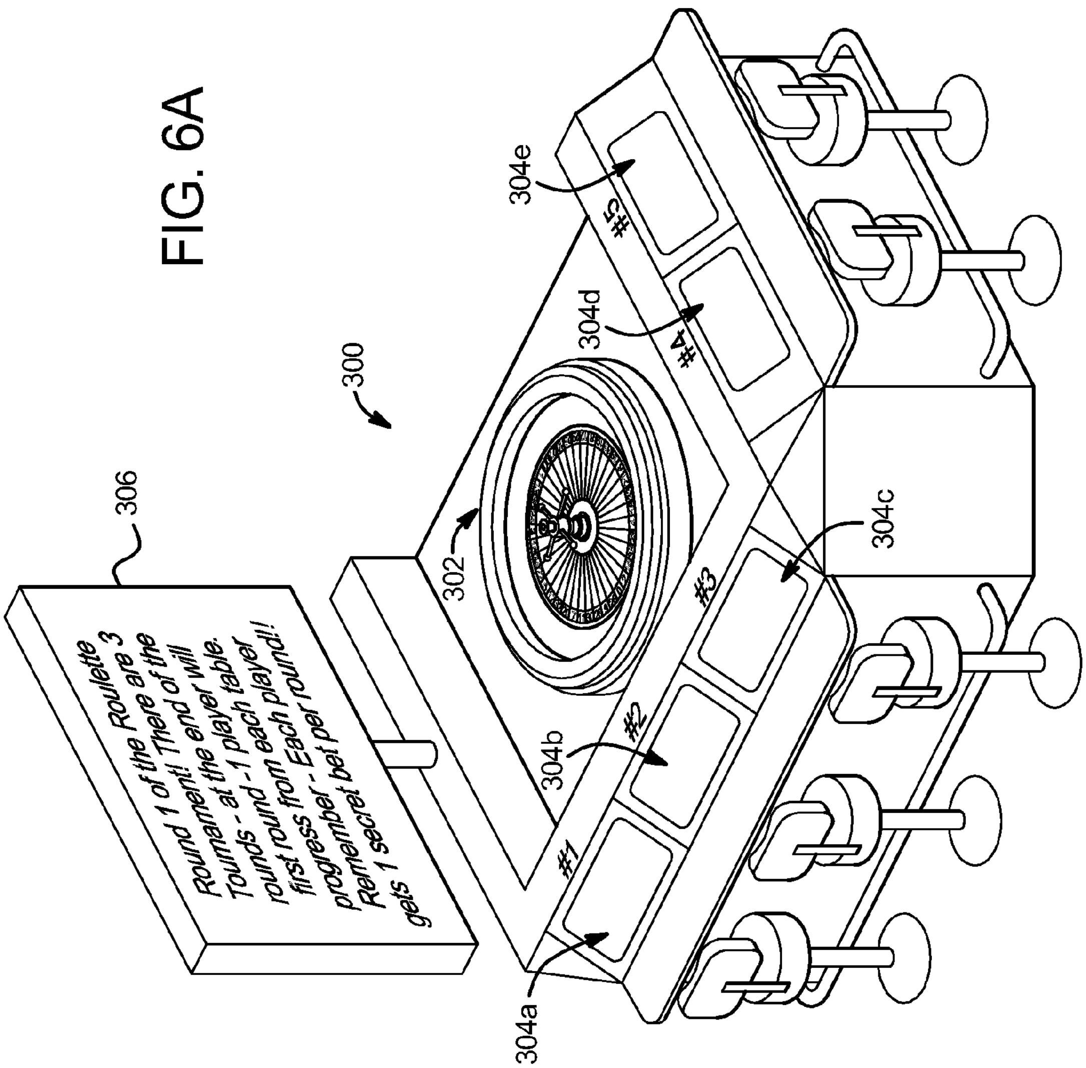
FIGS. 6A, 6B, 6E and 6J are perspective views of a roulette gaming table including a plurality of gaming machines.

As illustrated in FIGS. 6A, 6B, 6C, 6D, 6E, 6F, 6G, 6H, 6I and 6J in one embodiment, the tournament is a roulette tournament which includes a gaming system 300 which includes at least one gaming table including a roulette wheel 302 and player stations which each include a gaming device 304*a*, 304*b*, 304*c*, 304*d* and 304*e* where a plurality of players may play the roulette tournament. The tournament may include any suitable number of tables. A designated number of players from each of the tables participating in the roulette tournament advance to the next round. As illustrated in FIG. 6A, in one embodiment, the gaming system includes a common display 306 which displays rules and up to date bankroll information to each of the participating players. It should be appreciated that the common display 306 may display any suitable information.

As illustrated in FIG. 6A, in this embodiment of the tournament, there are three rounds of the roulette tournament and at the end of each round one player from each table progresses to the next round. In one embodiment, the roulette wheel includes a mechanical wheel and a mechanism that automatically releases a ball into the wheel to eventually land in one of the 38 pockets. The main pockets are numbered 1 to 36 alternating between red and black. The roulette wheel also includes a first green pocket numbered 0 and a second green pocket 00. It should be appreciated that the roulette wheel may be any suitable roulette wheel including a European roulette wheel or an American roulette wheel. In this embodiment of the roulette tournament, the players place a variety of bets using their individual gaming devices 304*a* through 304*e* at each of the player stations. For example, the gaming system enables the players to select the number of the pocket that the ball will land in, a range of the pockets that the ball will land in, the pocket colors and/or whether the pocket will be odd or even.

In this example tournament, each player is given a maximum number of virtual chips or credits to begin the tournament with, and the person with the most chips at the end of the round at each table advances to a next round. However, the tournament may be conducted in any suitable manner. The common display also informs players that each player has a single secret bet in this first round. That is, each player may make a wager that is not immediately revealed or indicated to the other players to try to gain an advantage in the game. Players wager based on the wagers made by other players which are displayed to the players of the tournament. For example, if a first player wagers a certain amount, the next player follows suit to wager that amount or more in certain instances to try to stay at pace with the first player. In this tournament, a first player places a wager and then a next player places a wager. That is, the wagering is done sequentially. After each game a next player or a determined player begins wagering for a next game. In the illustrated embodiment, each player has a secret bet that they may use to bet that is only displayed and indicated to other players after each of the players has placed their own bet. That is, other players do not know that a player is even placing a secret bet. In one embodiment, the secret bet is then displayed to the other players before the ball is released into the roulette wheel. In another embodiment, the secret bets are displayed after the ball has landed in one of the pockets of the roulette wheel.

Figure 6B:
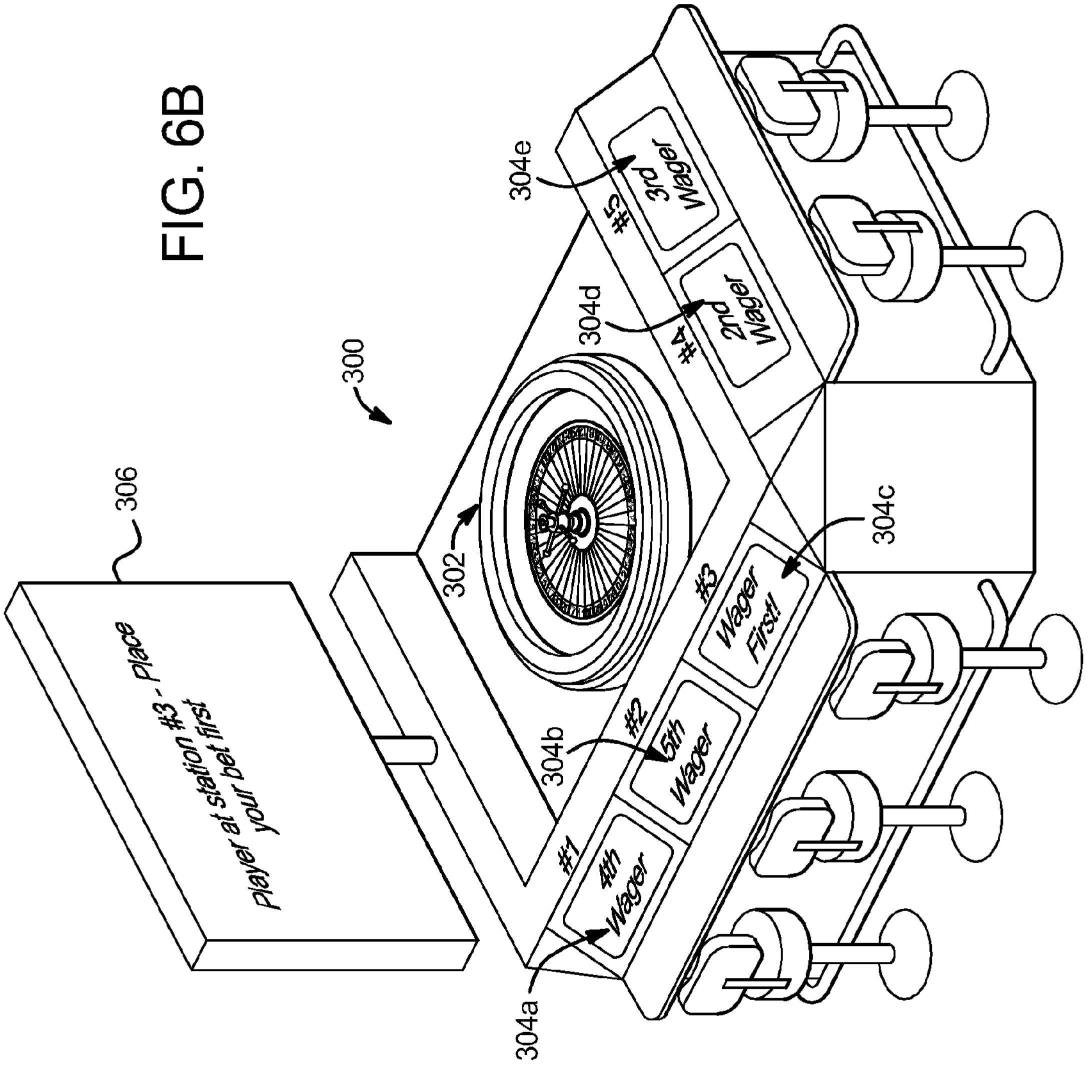
Figure 6C:
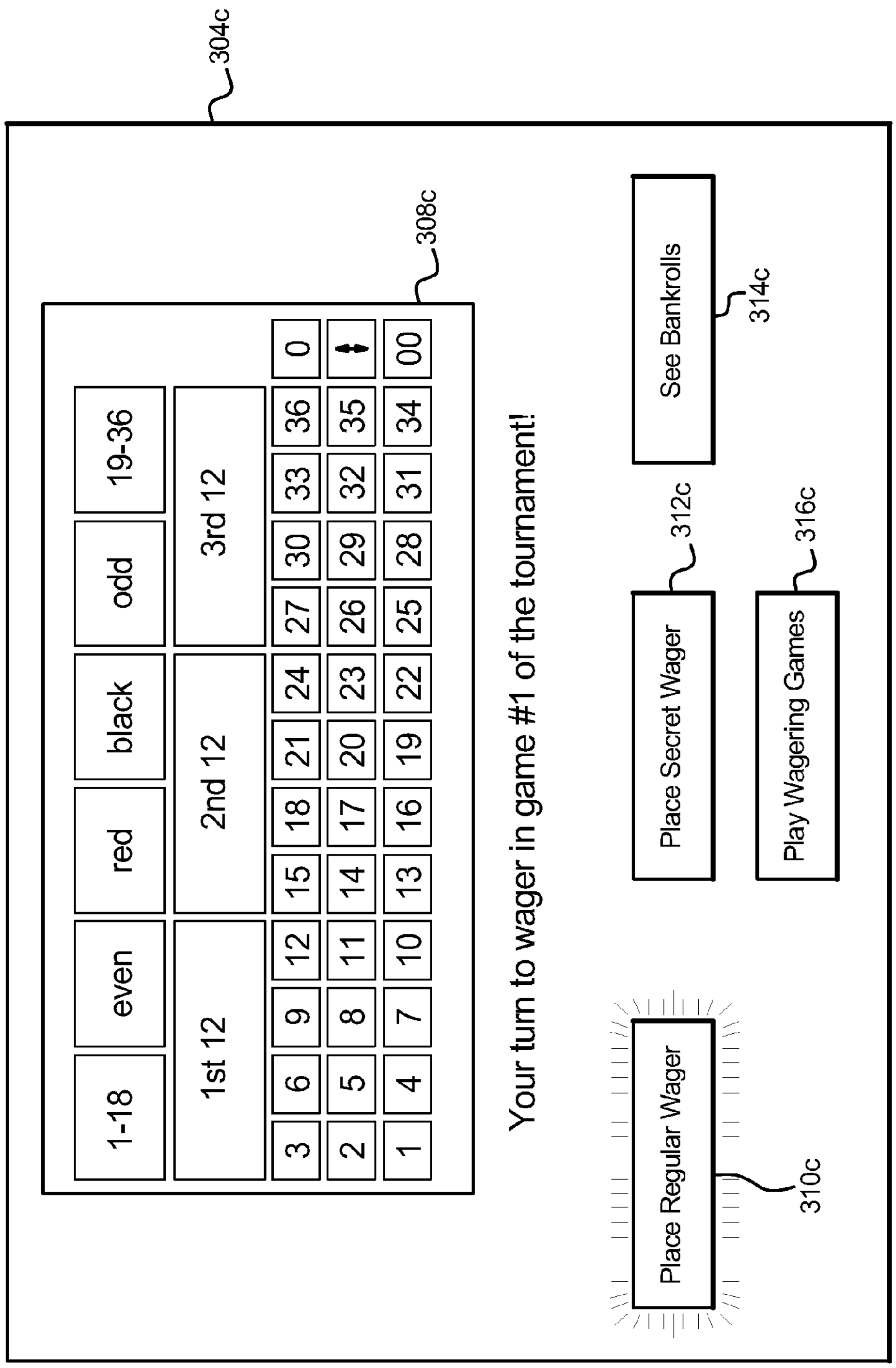
FIGS. 6C and 6D are screen shots of the display device of one of the gaming machines of FIGS. 6A, 6B, 6E and 6J enabling a player to make a tournament wager.
Figure 6D:
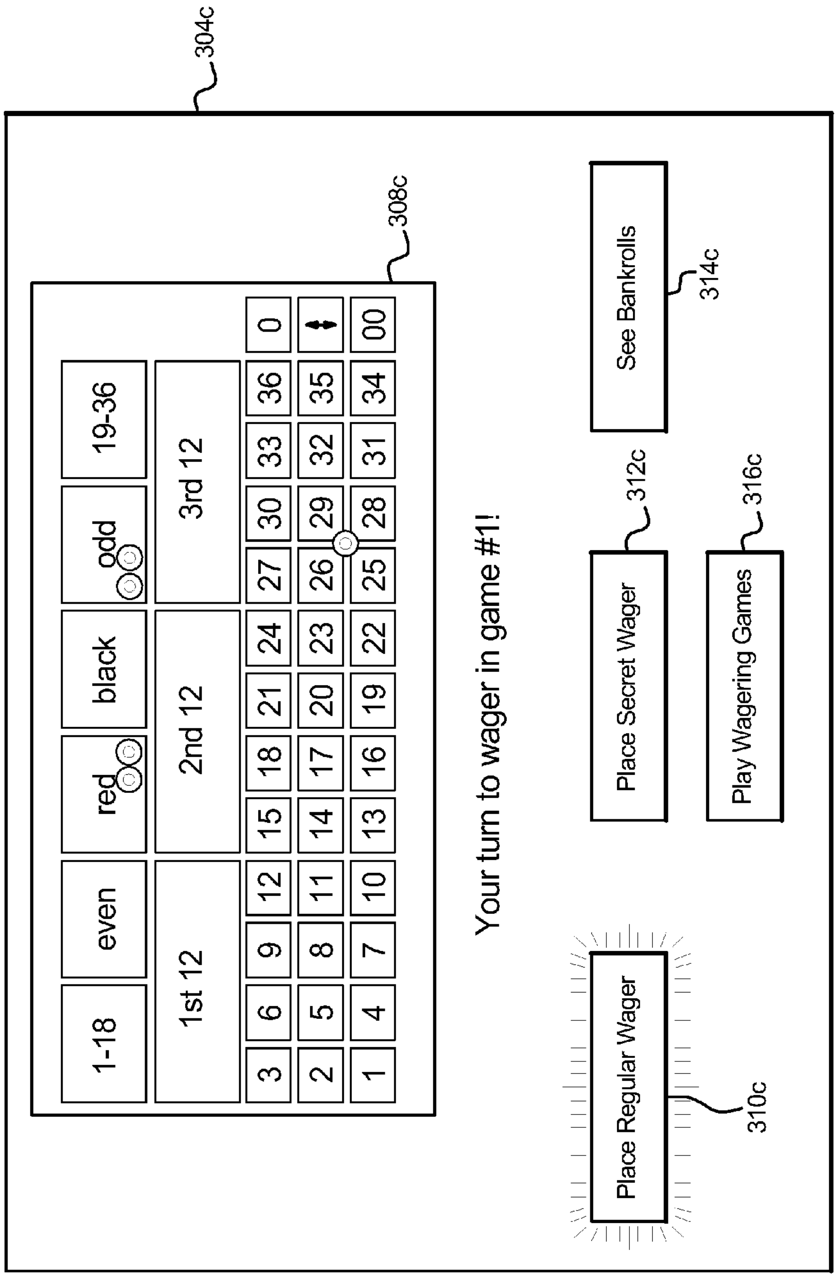

As illustrated in FIG. 6B, the player at player station 3 bets first in this first game of the tournament. It should be appreciated that the player to wager first may be determined in any suitable manner. As illustrated in FIG. 6C, in one embodiment, each gaming device at each player station provides the player a wagering roulette board 308*c* to bet on as displayed by the display device of the gaming device enabling the player to make pattern wagers. The individual gaming device in this embodiment explains to the player that it is their turn to wager in game one. In one embodiment, the gaming device includes a plurality of inputs such as place regular wager 310*c* button, place secret wager 312*c* button, see bankrolls 314*c* button and play wagering games 316*c* button. As illustrated in FIG. 6C, the player selects to place a regular wager 310*c*. As illustrated in FIG. 6D, the gaming system enables the player to place virtual chips on the roulette game board. The player places two chips on red, two chips on odd and one chip on the corner of 25, 26, 28 and 29. The player makes more wagers (not illustrated). These wagers are then displayed to the other players immediately after the wager is confirmed or placed. It should be appreciated that each game and/or round may have a minimum or maximum bet, or the player may play any number of chips the player wants depending on the configuration of the tournament. Each of the players then sequentially wagers in game one (not illustrated).

Figure 6E:
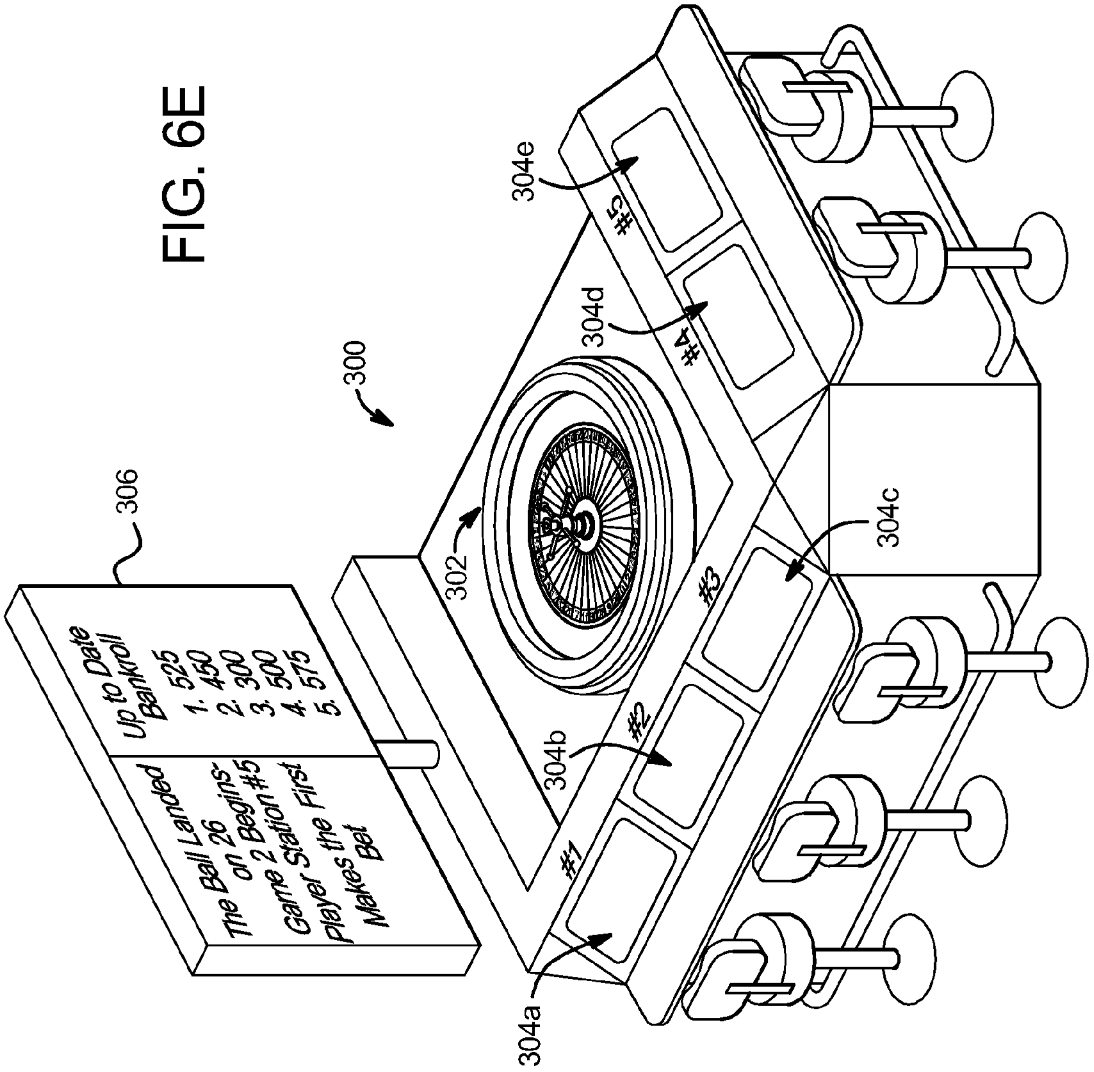

In one embodiment, after each player places a wager, the wager is displayed to each of the other players. As illustrated in FIG. 6E, the gaming system automatically spins the roulette wheel and releases a ball. That is, the ball is automatically released and spins around the roulette wheel and the ball lands in the pocket number 26. Game two begins, and in one embodiment, the player to the right of the player who first wagered makes the next wager and then is the last wagerer of the next round. As illustrated in FIG. 6E, in one embodiment, a player is randomly chosen to begin wagering on the next round. In one embodiment, once the players begin playing, the gaming system displays up to date bankrolls on the common display device 306. As illustrated in FIG. 6E, the player at player station 5 is winning the tournament. The player at player station 5 begins the wagering in game two, not illustrated.

Figure 6F:
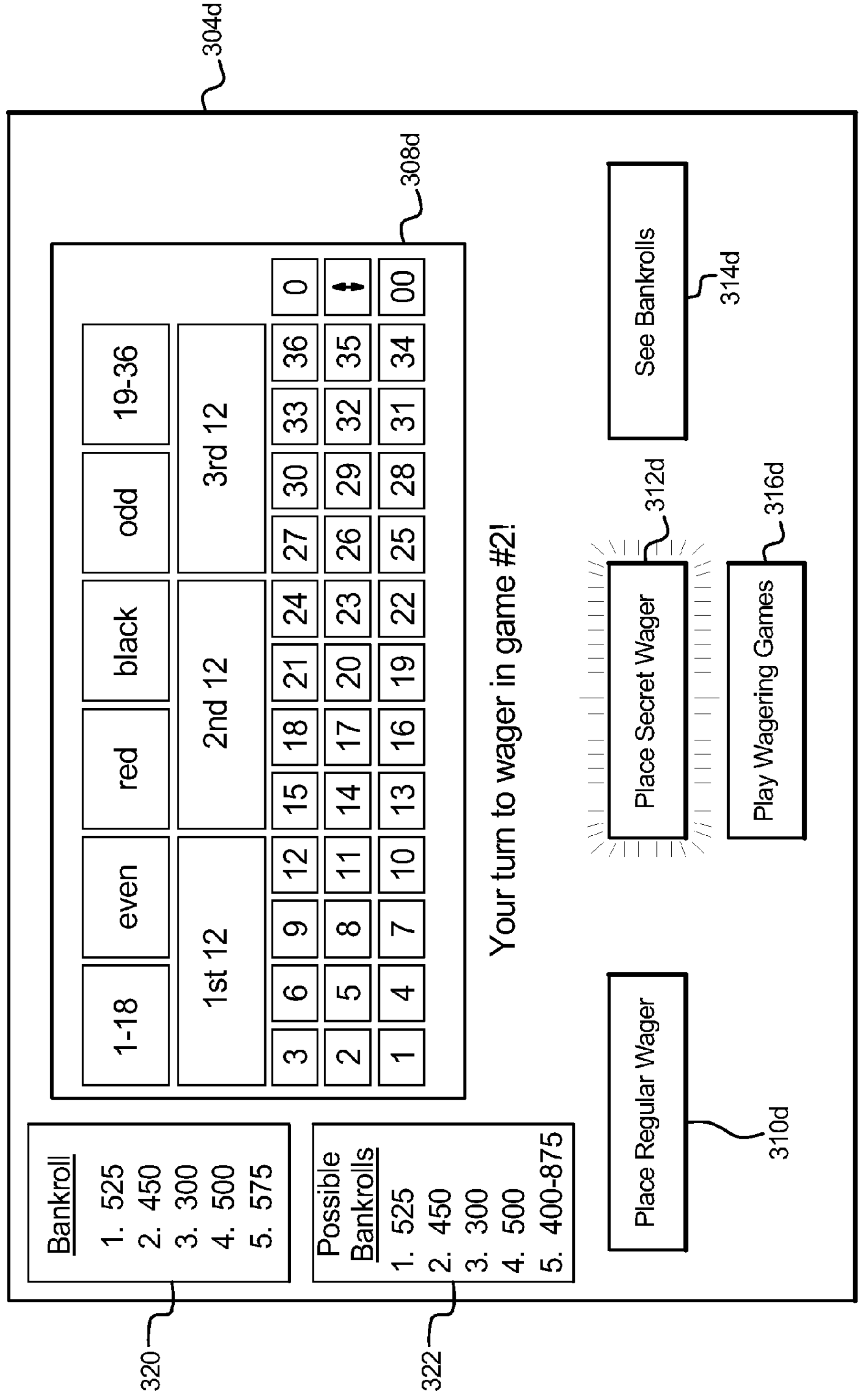
FIGS. 6F, 6G, 6H and 6I are screen shots of the display device of one of the gaming machines of FIGS. 6A, 6B, 6E and 6J enabling a player to make a secret tournament wager, a regular tournament wager and then play a non-tournament game.

FIG. 6F illustrates the display device of gaming device at player station 4 indicated by numeral 304*d* and which includes a roulette game board 308*d* and the plurality of inputs 310*d*, 312*d*, 314*d* and 316*d*. In one embodiment, the display device of the gaming machine also displays the actual bankrolls of the other players 320 and the possible bankrolls of the other players 322. In one embodiment, the display device displays the possible or potential range of bankrolls of the other players. That is, the display device displays what other players' bankrolls will be depending on if they win that game. For example, the player at player station #5 wagered first. Depending on if that player wins or loses, the player at player station #5 has may have 400 to 875 credits.

Figure 6G:
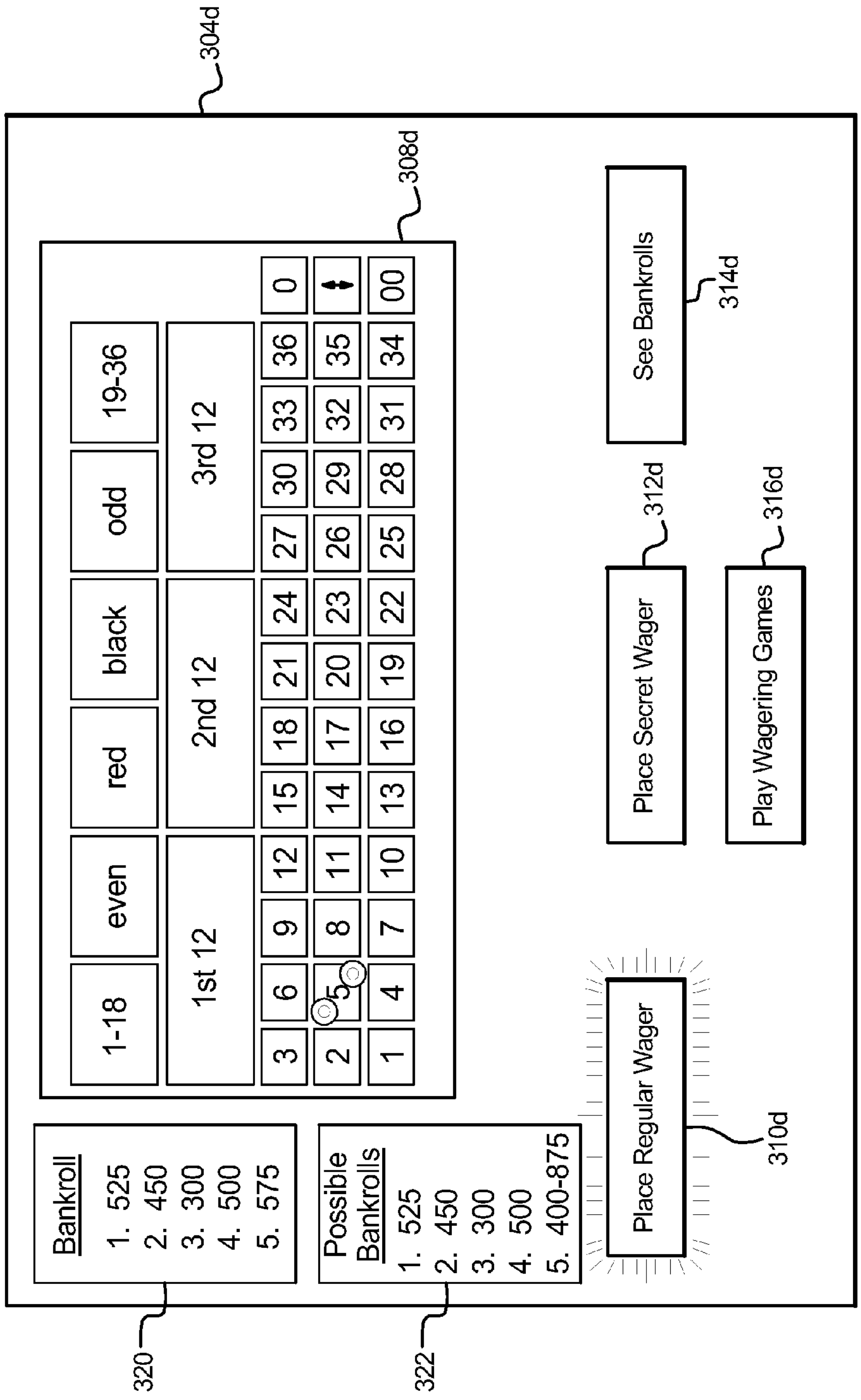
Figure 6H:
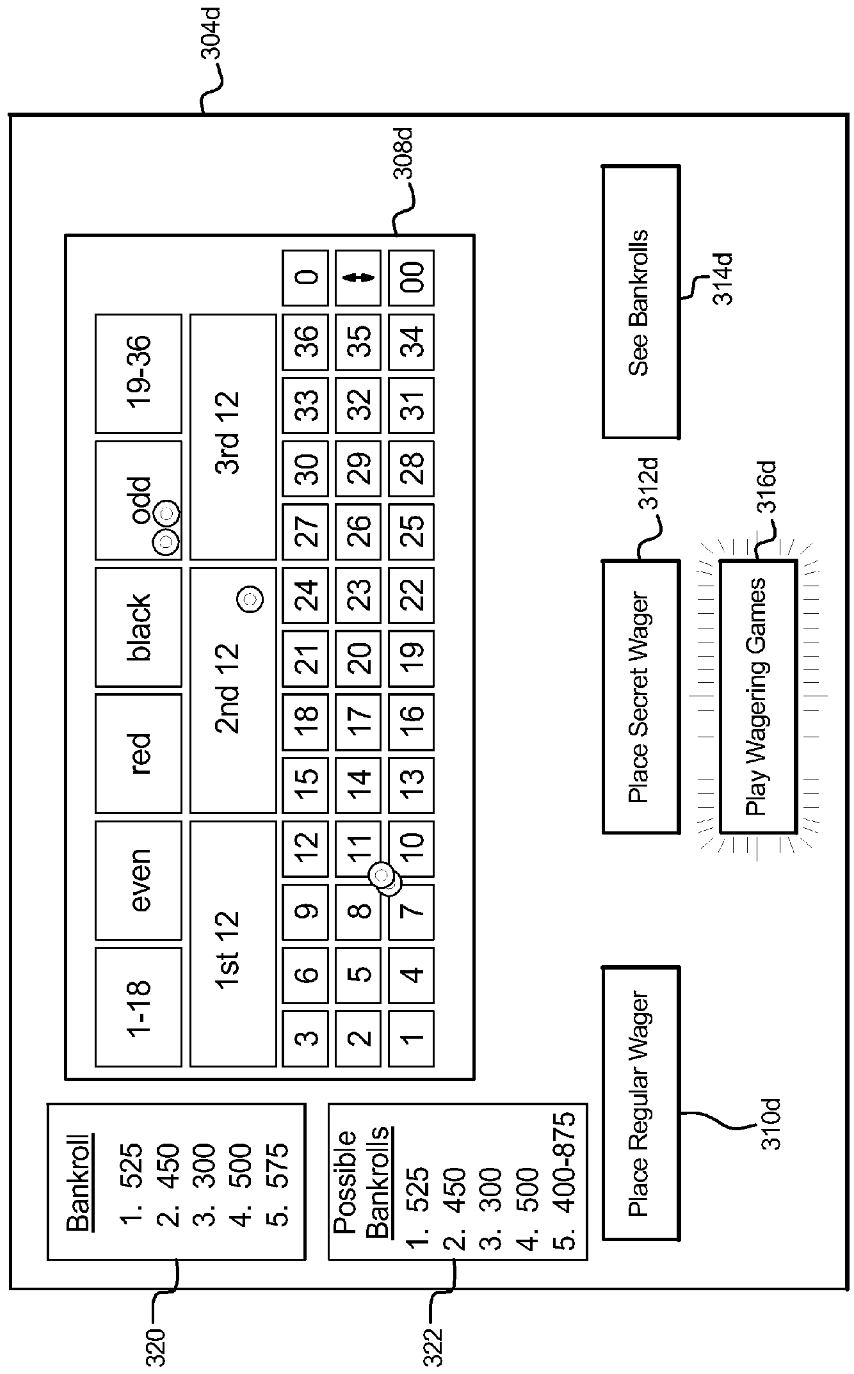
Figure 6I:
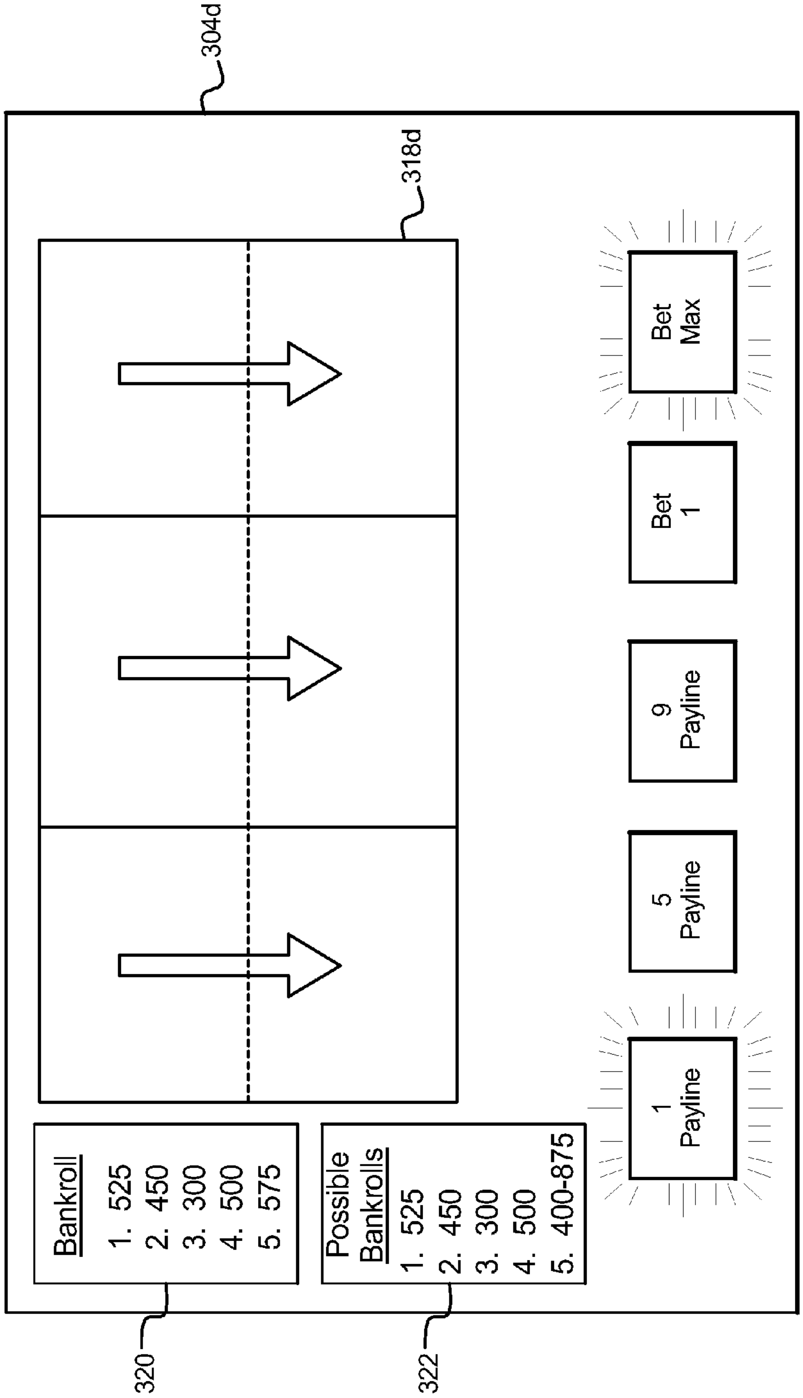

As illustrated in FIG. 6F, the player decides to make a secret wager. As illustrated in FIG. 6F, the player selects the place secret wager 312*d* button. In one embodiment, the gaming system does not indicate to other players that the player is making a secret wager. As illustrated in FIG. 6G, the player makes the secret wager of placing two chips on 5. As illustrated in FIG. 6H, the player at player station 4 makes a regular wager and places two chips on the 7, 8, 10 and 11 corner, two chips on the odds and one chip on the second 12. This wager is not displayed to the other players. This player also now selects to play wagering games. The player at the fourth player station is the first wagerer, and therefore, the player's wager cannot change based on another player's wager. Therefore, the player decides to play wagering games while other players are wagering as illustrated in FIG. 6I. The player selects to play a slot game. As illustrated in FIG. 6I, the player selects to play one payline and bet max. It should be appreciated that the wagering game may be any suitable wagering game. In one embodiment, the gaming system enables a player to play only one type of wagering or non-tournament game during the tournament. For example, the player may buy credits for non-tournament game play during the tournament or prior to the tournament, such as during tournament registration. In another embodiment, the gaming system enables a player to play a plurality of types of wagering or non-tournament games during the tournament.

Figure 6J:
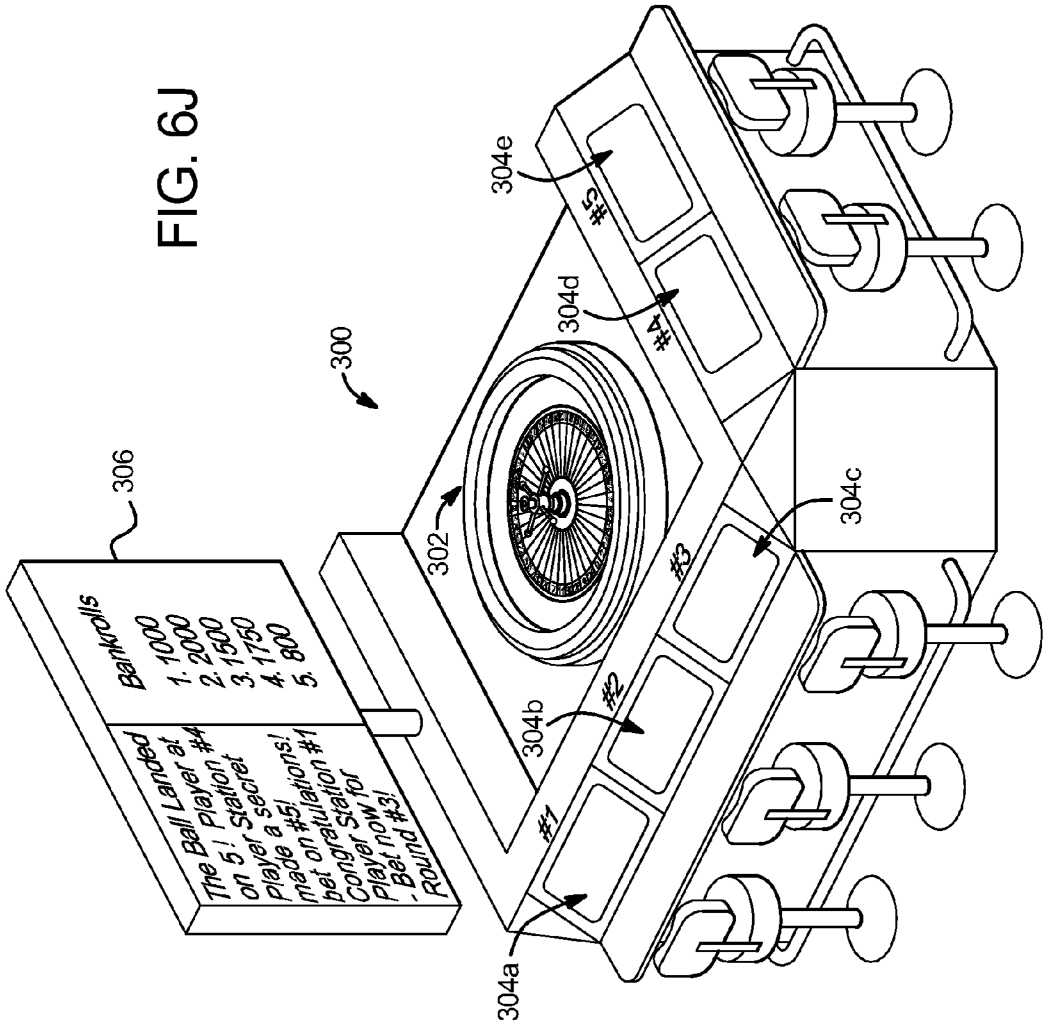

Each of the players continues to place their wager (not illustrated). After all of the wagers are placed, the gaming system automatically releases a ball and spins the roulette wheel. The ball lands on the 5 as illustrated in FIG. 6J. In this embodiment, the secret bets are announced after the balls lands on number. As illustrated in FIG. 6J, the common display shows that the player at player station 4 made a secret bet on number five and congratulates that player. The player at player station 5 now wagers for game number three of round one of the tournament. The tournament continues until ten games are over. In one embodiment, the gaming system enables each player to continue playing until the player is out of chips. At the end of game ten, whichever player at that table has the highest value in chips, advances to the next round. It should be appreciated that any suitable number of players may advance to the next round.

It should be appreciated that the casino-style tournament may be configured in any suitable manner. For example, there may be any suitable number of rounds and any suitable number of players may play at any suitable number of tables. Additionally, any suitable number of players may advance to the next round. It should also be appreciated that each round may include any suitable number of games. It should be appreciated that there may also be any suitable number of rounds.

It should be appreciated that the roulette wheel in one embodiment is an automatic wheel that releases a ball into the roulette wheel and lands in one of the pockets. In another embodiment, each table has a dealer and the dealer releases the ball into the roulette wheel. In another embodiment, the roulette wheel is a virtual wheel and the ball is a virtual ball.

It should be appreciated that the player who begins wagering for each game may be determined in any suitable manner. For example, each player is randomly assigned to a player station, and then a number of one of the assigned player stations is randomly selected to determine which player will begin betting for the first round. In another embodiment, the first player position may be determined randomly at the start of each round. The gaming system may randomly generate the order of players for each game and/or each round.

Figure 7:
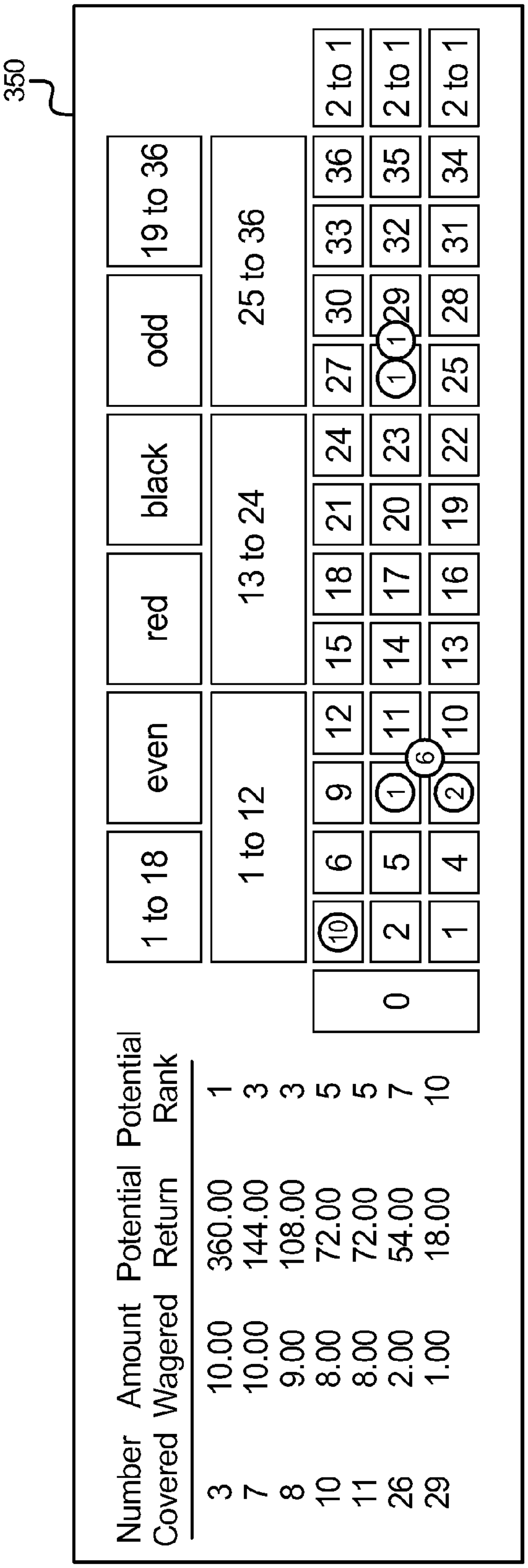
FIG. 7 illustrates one embodiment of enabling a player to view automatically calculated potential payouts while the player is placing different wagers.

As illustrated in FIG. 7, in one embodiment, the gaming system provides players with the potential returns while they select wagers. For example, if the player wagers ten chips on the number 3, they have a potential return of 360 if the tournament game outcome is a 3. If the player wagers eight chips on the corner of 7, 8, 10, and 11 and wagers two chips on 7, the player has a potential return of 144 if the tournament game outcome is 7. If the player wagers eight chips on the corner of 7, 8, 10, and 11 and wagers one chip on 8, the player has a potential return of 108 if the tournament game outcome is 8. If the player wagers ten chips on the corner of 7, 8, 10, and 11, the player has a potential return of 72 if the tournament game outcome is 10. If the player wagers eight chips on the corner of 7, 8, 10, and 11, the player has a potential return of 72 if the tournament game outcome is 11. If the player wagers one chip on the number 26 and wagers one chip on the split between 26 and 29, the player has a potential return of 54 if the tournament game outcome is 26. If the player wagers one chip on the split between 26 and 29, the player has a potential return of 18 if the tournament game outcome is 29. In one embodiment, the gaming system informs players of their potential rank if the number they wagered on is the tournament outcome. For example, if the player wagers ten chips on the number 3, they have a potential return of 360 if the tournament game outcome is a 3 and a potential ranking of 1. In one embodiment, the potential rankings are based on players that previously wagered in another round. In one embodiment, the potential rankings are based on players that previously wagered including the current round. For example, if another player previously wagered for that round, the gaming system takes that player's possible results into account and provides the player a potential ranking based on that information. In another embodiment, the gaming system informs the players what the player must wager to maintain a lead or a certain ranking. For example, the gaming system informs the player that they must wager at least $100 on a single number and win or other wagering possibilities and combinations to obtain a certain number of credits or a certain ranking.

FIG. 7 is one embodiment of how the gaming system can inform the player, as they are placing wagers, what their potential wager returns are. For example, as a player selects a wager, the gaming machine informs the player of how the player's bankroll would change and completes this step for each wager selected. When the player is satisfied with the wager, the player can then make an input to confirm all of the wagers to actually place the wager. This eliminates the player having to complete complex calculations and speeds up the progress with the game by helping the player make faster decisions.

In one embodiment, the player may select wagers out of turn and then confirm the wager or place the wager at a specific point in time. For example, while a first player is completing a wager, a second player may make inputs to select their wager. When it is the second player's turn to enter a wager, they may make an input to enter the previously selected wager. The wager can then be viewed by other players. For example, a player has 1200 credits and the bankroll is displayed as 1200. The player selects to wager 200 credits on black in a roulette tournament. The players bankroll then displays the range of 1000-1400. The player wagers 100 credits on the last column and the player's potential bankroll changes from 900 to 1600. These wager potential bankroll ranges may be only showed to the player making them or to some or all of the other players of the tournament. In one embodiment, if a player makes a secret wager, that player's potential bankroll is displayed to the player including the public wager and secret wager, but only the public wagers are displayed to the other players. For example, if a player makes public wagers that results in a public potential bankroll of 1200-2300, this bankroll is displayed to all of the players. If in addition to the public wager, the player makes a secret wager resulting in the potential win of 500 and loss of 100, the potential bankroll displayed to that player on that player's individual gaming machine is 1100 to 2800. In another embodiment, the gaming system displays a separate bankroll for secret wagers than normal wagers to a player. For example, in the above example, the gaming system displays to a player a public bankroll of 1200-2300 and a separate secret bankroll of 100 to 500. It should be appreciated that the secret wagers may be displayed to the players in any suitable manner.

It should be appreciated that some or all potential returns may be displayed to the player wagering and/or some or all of the other players in the tournament.

In one embodiment, the gaming system saves one or more betting patterns of players or enables the players to save one or more betting patterns enabling the player to place wagers faster. The gaming system enables the player to enter one or more betting patterns. The gaming system stores the betting pattern for that player for either that tournament, that tournament round or all future tournaments. In one embodiment, the gaming system stores the betting information in conjunction with the player tracking system. The gaming system enables the player to recall one or more betting patterns. The gaming system also enables the player to go in and add and delete stored betting patterns.

For example, if a player saves a betting pattern where the player wagers on ten credits red and ten credits on 23 in a roulette tournament, the player enters that pattern prior to a tournament via a gaming machine, a kiosk, the internet, a mobile device or any other suitable method. The player saves this betting pattern. When that player identifies himself to play a tournament, the gaming system enables the player to make one input to bet ten credits red and ten credits on 23. The gaming system enables the player to change the wagers in any suitable manner. In different embodiments, the gaming system enables the player to save one or a plurality of different betting patterns.

Figure 8A:
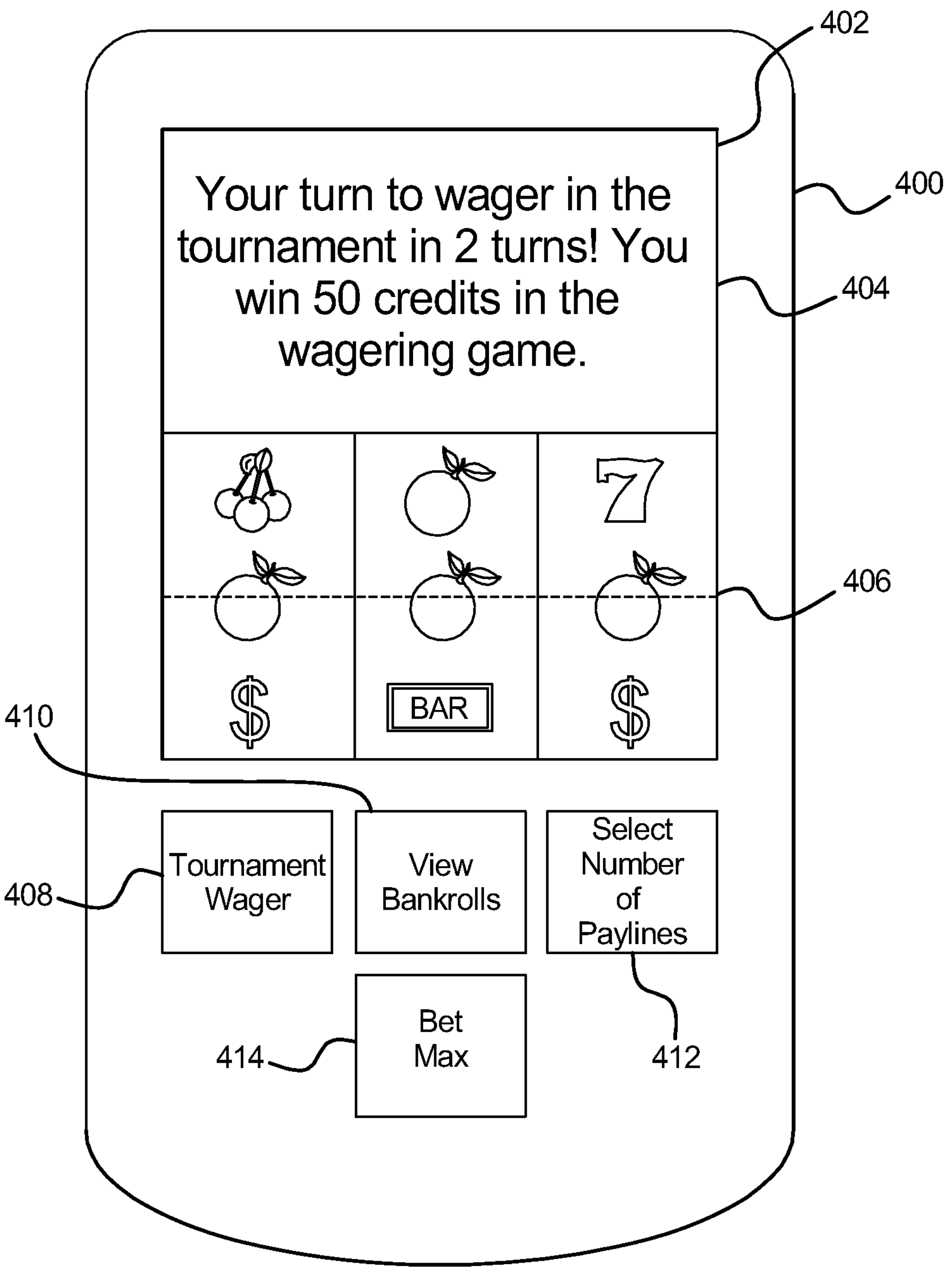
FIGS. 8A and 8B illustrate one embodiment of a hand held gaming machine enabling the player to simultaneously play tournament and non-tournament games.

As illustrated in FIG. 8A, in one embodiment the gaming device is a handheld gaming device 400. As illustrated in FIG. 8A, in one embodiment, the gaming device displays game information 404 and if the player selects to play a wager game, the gaming device displays a wagering game or a non-tournament game 406. For example, the gaming system informs the player that it is their turn to wager in the tournament after two players have placed their wager. That is, after two other players wager in the tournament, it is that player's turn to wager in the tournament. The gaming device also informs the player that they win 50 credits in the wagering game. In the illustrated embodiment, the player is playing a non-tournament slots game 406. As illustrated in FIG. 8A, in one embodiment the gaming device includes a plurality of inputs that enable the player to play tournament games and non-tournament games. For example, there is a tournament wager input 408, a view bankrolls input 410 that enables the players to view the bankrolls of other players participating in the tournament, a select number of paylines input 412 and a bet max input 414. It should be appreciated that the gaming device may include any suitable number and types of inputs.

Figure 8B:
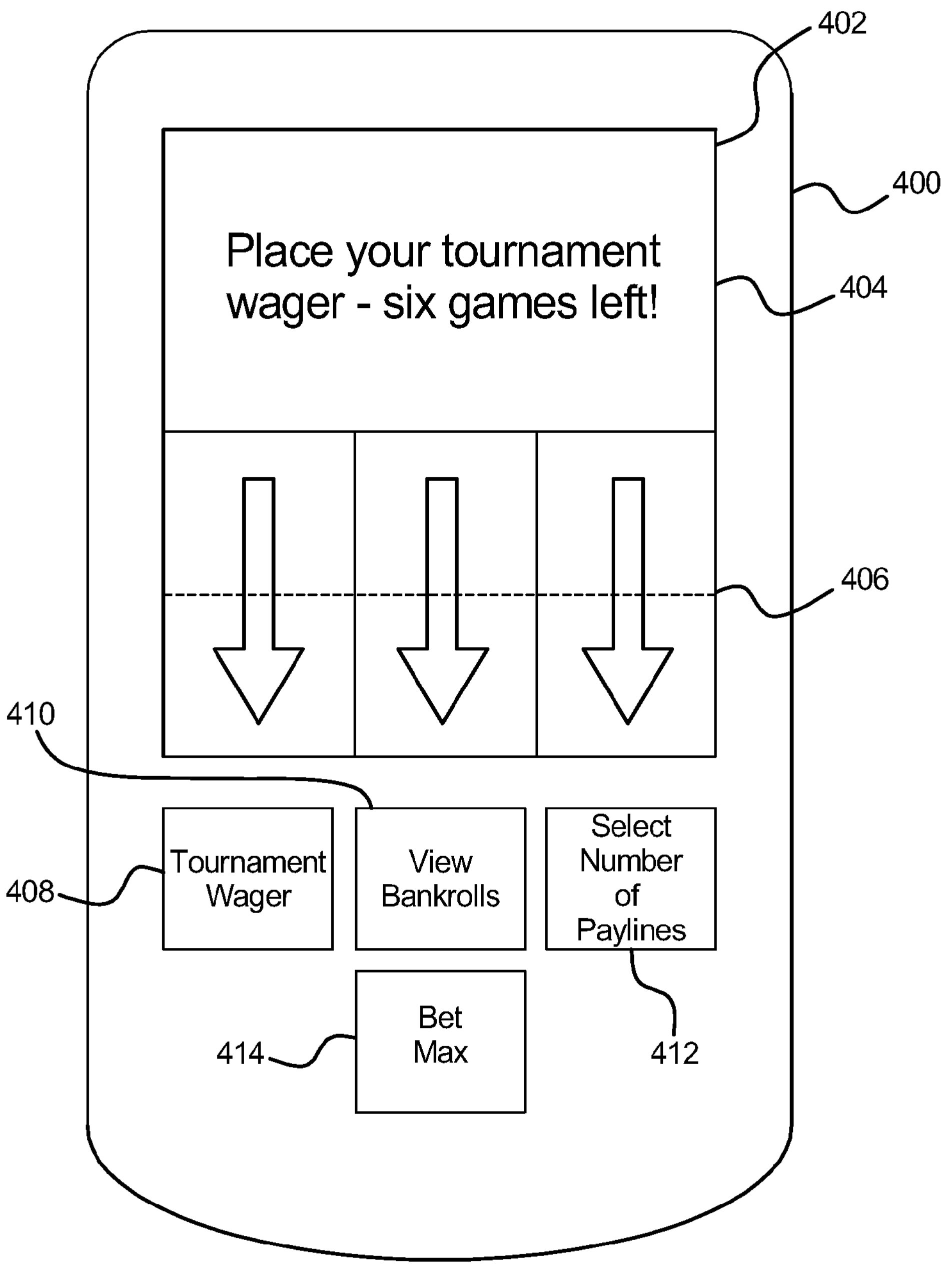

As illustrated in FIG. 8B, the gaming system informs the player on the display device 402 of the gaming device 400 that it is that player's turn to wager and that there are six games left in the tournament. As the gaming device informs the player that it is their turn to wager, the player is simultaneously playing a slot game 406 in the lower half of the display device. It should be appreciated that the display device may display tournament and non-tournament games in any suitable manner. In one embodiment, the gaming device only displays a single tournament or a non-tournament game so that the player does not get confused during tournament play and non-tournament play. In another embodiment, the player may choose how the tournament games and the non-tournament games are displayed. In another embodiment, the gaming device displays tournament and non-tournament games simultaneously. Though in certain embodiments the player has the option to simultaneously play tournament and non-tournament games, the player may choose to just the play the tournament games.

Figure 9:
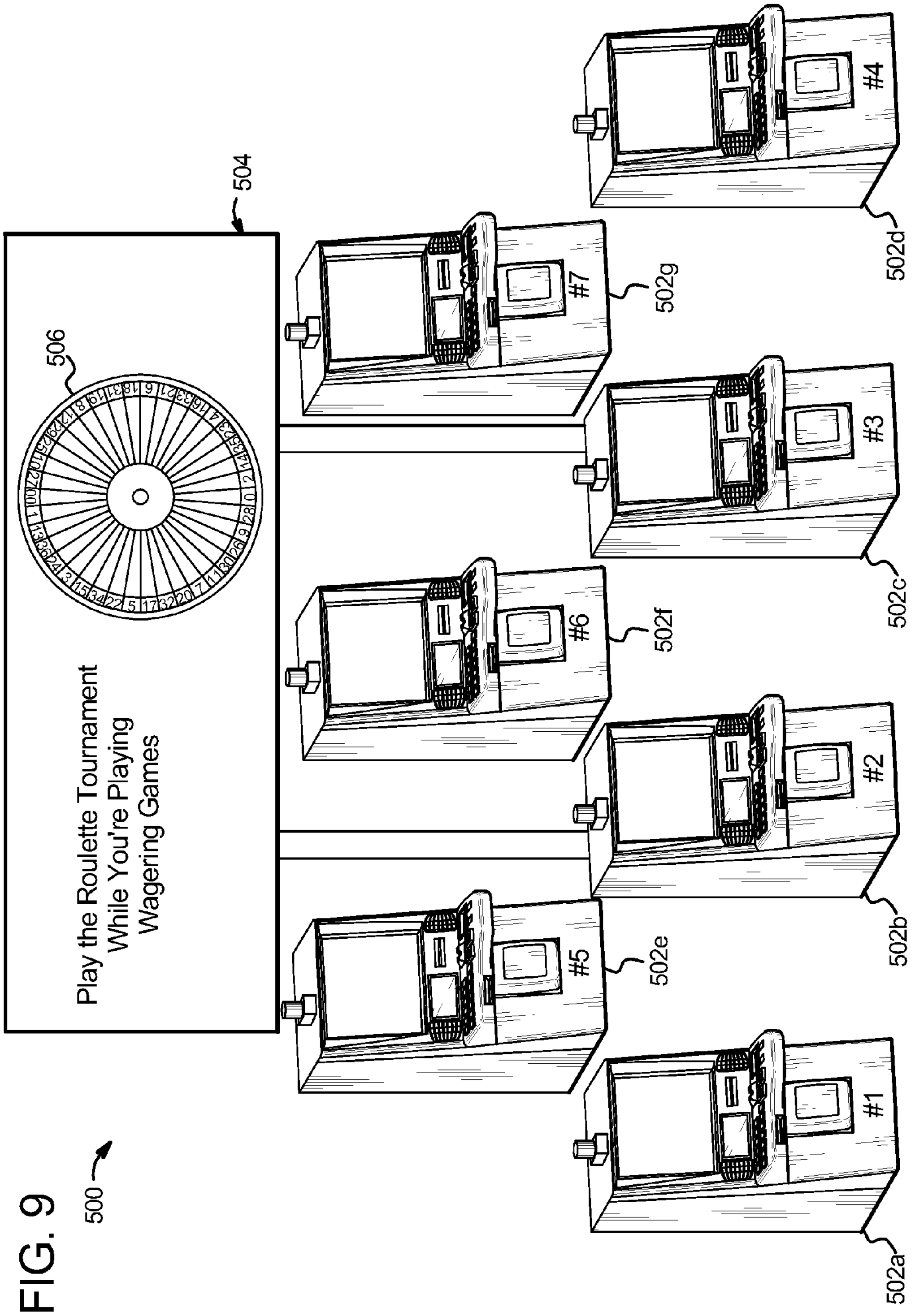
FIG. 9 illustrates one embodiment of a gaming system including a roulette tournament that enables the players to simultaneously play tournament and non-tournament games.

In one embodiment, as illustrated in FIG. 9 a roulette wheel 506 or a virtual roulette wheel is displayed on a display device 504. In one embodiment, each of the players of the roulette tournament plays the roulette tournament on a separate gaming machine 502*a*, 502*b*, 502*c*, 502*d*, 502*e*, 502*f* and 502*g*. The gaming system enables the players to individually enter their wagers in a sequential manner. In one embodiment, the players are given one or more secret wagers.

It should be appreciated that the gaming system may enable a player to play any suitable type of wagering games including but not limited to slots, roulette, craps, table poker (such as Three Card Poker® card game, Three Card Draw Poker® card game, Caribbean Stud Poker® card game, Let It Ride® card game, or any other suitable form of table poker), video poker, bunco, poker, blackjack, keno and bingo. It should also be appreciated that the gaming system may enable the player to make/check sportsbook wagers and make/check live Keno wagers while playing a tournament.

It should be appreciated that the tournament game may be any suitable game such as roulette, baccarat, pai gow poker, sic bo, pai gow tiles and craps. It should also be appreciated that the gaming system may enable players to play any suitable number of tournaments at a same time. For example, a single player may simultaneously play two craps tournaments or simultaneously play a craps and a roulette tournament. It should be appreciated that the gaming system may enable players to simultaneously participate in any suitable number of tournament games and non-tournament games.

It should be appreciated that tournament may be configured in any suitable fashion. It should be appreciated that each round of the tournament may be played on a similar type of gaming format or a different type of gaming format. For example, a first round of the tournament may be played on the handheld gaming devices, and the second round of the tournament may be played on regular stand alone gaming devices. The final round of the tournament may be played at a table creating excitement for everyone. In another embodiment, the gaming system enables the player to select how they want to play the tournament. For example, the player may play the tournament at a gaming table or on a handheld gaming device. It should be appreciated that the rounds of each tournament may be completed in any suitable format. In another embodiment, the gaming system includes a central gaming outcome device, such as a single live roulette wheel for a large number of tournament players. In one embodiment, the gaming system forms a plurality of sub-groups of players where players within each subgroup play against the other subgroups of players. The subgroups may include round-robin betting within the subgroup. After all of the subgroups have completed wagering, a common game outcome is generated. For example, six players compete against each other in a first subgroup and six different players compete against each other in a second subgroup. For each game in the tournament round, the players within each subgroup follow standard round-robin betting. In one embodiment, each subgroup commences with their wagering independently of the other subgroups. Once all of the subgroups have finished wagering, a ball is released into a spinning roulette wheel (automatically or via a dealer) and the pocket into which the ball lands indicates the tournament game outcome for all of the subgroups. In one embodiment, a certain number of players within each subgroup advance to the next round of the tournament. In another embodiment, the six top players in all of the subgroups advance to a next round of the tournament. That is, in one embodiment, the gaming system determines which players proceed to a next round independently of the groups of the players or the tables of the players.

It should be appreciated that any suitable number of winners may proceed to a next round of the tournament in certain embodiments. It should be appreciated that in different tournaments the number of players that proceed are based on the number of people involved in each group of players for each round of the tournament. For example, if ten players are in a group or heat, then a certain number of players advance from that group or heat. In another embodiment, the players with the top number of chips advance from each round regardless of which groups players are in.

It should be appreciated that additional wagering may be employed in the tournament in any suitable manner. For example, in one embodiment, the gaming system enables other players to wager on one or more aspects of the tournament. In one embodiment, the players who are participating in the tournament may wager on other players or themselves in the tournament using tournament or non-tournament credits. For example, the gaming system enables the tournament players to wager tournament credits on a player to win the round and if that player wins, they win tournament credits. For example, the gaming system enables the tournament players to wager non-tournament credits on a player to win the round and if that player wins, they win non-tournament credits. In one such embodiment, the gaming system enables players to complete other wagers with their tournament funded credits or chips. For example, the gaming system enables a tournament player to wager tournament and non-tournament wagers in a same game. These additional wagers on the tournament may or may not be regulated by minimum and maximum wagers.

In different embodiments, the gaming system enables players to buy more tournament credits during the play of the tournament. In one embodiment, the gaming system enables a player to buy back into the tournament if the player loses all of his or her tournament credits during play of the tournament. For example, if the player runs out of tournament credits, the player may have a limited or alternatively unlimited number of chances to rejoin the tournament by using real credits, cash or credit in exchange for tournament credits to continue playing in the tournament. It should be appreciated that the gaming system may only enable the players to reenter the tournament a limited number of times per tournament or per round of each tournament. In one embodiment, the gaming system enables players to buy more tournament credits at any time. In one embodiment, the gaming system enables players to buy more tournament credits at certain points in the tournament, such as between rounds or at the end of each tournament game. In another embodiment, the gaming system does not enable players to purchase more tournament credits.

In another embodiment, the gaming enables non-tournament players to place wagers on the tournament. For example, bystanders not participating in the tournament may wager on who is going to win the round at a certain table or a certain group. In another example, the gaming system enables non-tournament players to wager non-tournament credits on one or more games of the tournament. These additional wagers on the tournament may or may not be regulated by minimum and maximum wagers.

It should be appreciated that the gaming system may include any suitable type of messaging system. In one embodiment, the gaming system individually or personally messages players regarding their wager turns, their standings, other players' standings, and/or other players' bankrolls. In one embodiment, the gaming system posts players' standings, players' wagers and/or players' bankrolls.

It should be appreciated that the gaming system may enable players to wager in any suitable manner. In one embodiment, one or more rounds or games of the tournament have wager limits. In one embodiment, one or more rounds or games of the tournament do not have wager limits. For example, the last spin of one or more rounds is a golden ball spin which includes additional wagering opportunities such as the elimination of any bet limits or the doubling of any awards. In one embodiment, one or more types of wagers have wager limits, such as wager minimums and/or wager maximums. For example, non-secret tournament game wagers have wager minimums and maximums but secret tournament wagers do not have minimums and maximums. The limits placed on wagers contributes to players' tournament strategies.

It should be appreciated that the gaming system may enable the players to make secret wagers in any suitable manner. In one embodiment, the gaming system provides each player of the tournament a same number of secret wagers for the tournament. In another embodiment, the gaming system provides each player of the tournament a same number of secret wagers for each round of the tournament. In one embodiment, the gaming system provides one or more tournament players different numbers of secret wagers. For example, the gaming system provides a winner of a past tournament an extra secret wager. In another embodiment, the gaming system enables players to purchase quantities of secret wagers. In another embodiment, the gaming system awards the players numbers of secret wagers based on a tournament game event. It should be appreciated that the gaming system may determine the number of secret wagers to provide players based on any suitable tournament or non-tournament factor or element including but not limited to player rank, tournament rank, amount wagered in a designated time period, number of tournaments played in a designated time period, amount wagered at a designated game and tournament game events.

In one embodiment, the gaming system enables the players to make secret wagers at any suitable time during tournament game play. For example, the gaming system enables a player to make a secret wager on a tournament game outcome up until a designated time before the outcome is generated. That is, the gaming system enables the player to make a secret wager out of turn and the other players have no indication a player is making a secret wager or not. In one embodiment, the gaming system enables the players to prestore secret wagers so that a player can easily enter the secret wager in or out of turn such that other players are not aware of the secret wager being placed. For example, the wager may prestore the secret wager of 300 credits on black and 200 credits on the third column in a roulette tournament. When it is the player's turn, the player can quickly make a single input to make the secret wager on top of the standard wager, not signaling the actions to other players. In one embodiment, the gaming system only enables players to prestore secret wagers to be used during the player's turn. In another embodiment, the gaming system enables players to prestore secret wagers to be used whenever the player is allowed to enter a secret wager. In another embodiment, the gaming system enables players to prestore any wagers.

It should be appreciated that the wagers may be utilized in any suitable manner. In one embodiment, the gaming system enables the players to select another player to view their secret wager. In another embodiment, the gaming system enables players to privately wager against other players and tournament and/or non-tournament credits are traded amongst the players in the tournament. That is, the gaming system enables players to place player to player wagers. For example, a player may message another player to wager against that player. For example, a first player messages a second player that they wager $50 against that second player that the first player will win that round. The second player may then accept or reject the wager. The credits are then traded among the players. This type of player to player wagering enables players to have an increased competition with one or more other players. In another example, players make player to player wagers with/against the house. A player may place secret wagers or wager against or with other players in any suitable manner. In one embodiment, the gaming system awards a number of player to player wagers to players based upon tournament game or tournament round events. In one embodiment, the gaming system awards a number of secret wagers to players based upon tournament game or tournament round events. In another embodiment, the gaming system enables players to purchase the ability to make secret wagers. In another embodiment, the gaming system enables players to purchase the ability to make player to player wagers.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one controller; and a plurality of groups of gaming machines, each group including a plurality of gaming machines and each gaming machine including at least one display device and at least one input device, wherein each gaming machine is configured to communicate with the at least one controller, and wherein said at least one controller and said gaming machines are configured for each group of gaming machines for play of a table tournament to:

(a) display a total number of tournament credits for each player of one of the gaming machines of said group;

(b) enable a first player of a first one of the gaming machines of said group to place at least one wager for a tournament game using the first player's total number of tournament credits;

(c) sequentially enable the players of each of the other gaming machines of said group to place wagers for the tournament game using their respective total numbers of tournament credits;

(d) at any time until wagering is closed for the tournament game, for each of the gaming machines of said group, enable the player of said gaming machine to place a wager that is not indicated to the players of the other gaming machines of said group;

(e) simultaneously determine and display a same tournament game outcome for each of the players of the gaming machines of said group;

(f) for each of the players of the gaming machines of said group, determine a number of tournament credits based at least in part on any wagers placed by said player and said tournament game outcome and add said determined number of tournament credits to said player's total number of tournament credits;

(g) display tournament rankings of the players of the gaming machines of said group, wherein said tournament rankings are based on the total number of tournament credits of each of the players; and (h) repeat (b) to (g) a predetermined number of times for each of the players of the gaming machines of said group with tournament credits remaining, wherein players of gaming machines of different groups may place wagers simultaneously.

2. The gaming system of claim 1, wherein each group of gaming machines is associated with a different gaming table.

3. The gaming system of claim 1, wherein the tournament game is selected from the group consisting of: roulette, baccarat, pai gow poker, sic bo, pai gow tiles and craps.

4. The gaming system of claim 1, wherein said at least one controller and said gaming machines are configured for each group of gaming machines for play of the table tournament to enable the players of the gaming machines of said group to place pattern wagers.

5. The gaming system of claim 1, wherein said at least one controller and said gaming machines are configured for each group of gaming machines for play of the table tournament to enable the players of the gaming machines of said group to wager non-tournament credits on at least one non-tournament game.

6. The gaming system of claim 1, wherein said at least one controller and said gaming machines are configured for each group of gaming machines for play of the table tournament to enable the players of the gaming machines of said group to wager non-tournament credits on said tournament game.

7. The gaming system of claim 1, wherein said at least one controller and said gaming machines are configured for each group of gaming machines for play of the table tournament to enable the players of the gaming machines of said group to wager non-tournament credits on at least one aspect of the table tournament.

8. The gaming system of claim 1, wherein said at least one controller and said gaming machines are configured to display the tournament rankings.

9. The gaming system of claim 1, wherein said at least one controller and said gaming machines are configured for each group of gaming machines for play of the table tournament to display the total number of tournament credits of each of the players of the gaming machines of said group after the display of the same tournament game outcome for each of the players for a plurality of tournament games.

10. The gaming system of claim 1, wherein said at least one controller and said gaming machines are configured for each group of gaming machines for play of the table tournament to display the determined number of tournament credits of each of the players of the gaming machines of said group after the display of the same tournament game outcome for each of the players for a plurality of tournament games.

11. The gaming system of claim 1, wherein said at least one controller and said gaming machines are configured for each group of gaming machines for play of the table tournament to determine a tournament winner.

12. The gaming system of claim 11, wherein said at least one controller and said gaming machines are configured for each group of gaming machines for play of the table tournament to display a tournament award to the tournament winner.

13. The gaming system of claim 12, wherein said tournament award is selected from the group consisting of a monetary award, a physical award, an entry into a next round of the table tournament, an entry into another tournament, a quantity of tournament credits and a number of non-tournament credits.

14. The gaming system of claim 1, wherein said at least one controller and said gaming machines are configured for each group of gaming machines for play of the table tournament to enable a plurality of the players of the gaming machines of said group to place player to player wagers using non-tournament credits.

15. The gaming system of claim 1, wherein said at least one controller and said gaming machines are configured for each group of gaming machines for play of the table tournament to enable a plurality of the players of the gaming machines of said group to place player to player wagers using tournament credits.

16. A gaming system comprising:

at least one controller;

at least one display device; and a plurality of gaming machines, each gaming machine configured to communicate with the at least one controller, said at least one controller, said at least one display device and said gaming machines configured during play of a table tournament to:

(a) enable a tournament player at one of the gaming machines to place a wager on a tournament game using tournament credits provided to said tournament player;

(b) display said tournament player's wager;

(c) enable another tournament player at another one of the gaming machines to place a wager on the tournament game using tournament credits provided to said other tournament player;

(d) display said other tournament player's wager;

(e) repeat (a) to (d) for a designated number of tournament players;

(f) at any time until wagering is closed for the tournament game, for each of the gaming machines, enable the tournament player at said gaming machine to place a wager that is not displayed to the tournament players at the other gaming machines;

(g) determine a same tournament game outcome for each of the tournament players;

(h) indicate the determined tournament game outcome to the tournament players; and (i) determine and display how many tournament credits each of the tournament players has.

17. The gaming system of claim 16, wherein said at least one controller, said at least one display device and said gaming machines are configured during play of the table tournament to enable non-tournament players to wager non-tournament credits on the tournament game of said table tournament.

18. The gaming system of claim 16, wherein said at least one controller, said at least one display device and said gaming machines are configured during play of the table tournament to enable non-tournament players to wager non-tournament credits on at least one aspect of said table tournament.

19. The gaming system of claim 16, wherein said at least one controller, said at least one display device and said gaming machines are configured during play of the table tournament to enable the tournament players to wager non-tournament credits on the tournament game of said table tournament.

20. The gaming system of claim 16, wherein said at least one controller, said at least one display device and said gaming machines are configured during play of the table tournament to enable the tournament players to wager non-tournament credits on at least one aspect of said table tournament.

21. The gaming system of claim 16, wherein any wagers placed on the tournament game that are not displayed are secret wagers, and said at least one controller, said at least one display device and said gaming machines are configured to provide each of a plurality of the tournament players a designated number of secret wagers to use during the table tournament.

22. The gaming system of claim 21, wherein the designated number of secret wagers provided to at least two of the plurality of the tournament players is different.

23. The gaming system of claim 21, wherein the secret wagers may include wagers on another tournament player's tournament game.

24. The gaming system of claim 21, wherein said at least one controller, said at least one display device and said gaming machines are configured during play of the table tournament to provide the designated number of secret wagers to the tournament players based upon tournament game outcomes or tournament round events.

25. The gaming system of claim 16, wherein the tournament game is selected from the group consisting of roulette, baccarat, pai gow poker, sic bo, pai gow tiles and craps.

26. The gaming system of claim 16, wherein said at least one controller, said at least one display device and said gaming machines are configured during play of the table tournament to enable the tournament players to place pattern wagers.

27. The gaming system of claim 16, wherein said at least one controller, said at least one display device and said gaming machines are configured for play of the table tournament to enable the tournament players to wager non-tournament credits on at least one non-tournament game.

28. The gaming system of claim 16, wherein the at least one controller is configured to randomly assign the tournament players to tables.

29. The gaming system of claim 16, wherein said at least one controller, said at least one display device and said gaming machines are configured for play of the table tournament to display rankings of the tournament players, wherein said rankings are based on numbers of tournament credits each of the tournament players has.

30. The gaming system of claim 16 wherein said at least one controller, said at least one display device and said gaming machines are configured for play of the table tournament to display potential bankrolls of the tournament players.

31. The gaming system of claim 16, wherein said at least one controller, said at least one display device and said gaming machines are configured for play of the table tournament to display potential bankrolls of the tournament players and a likelihood of one or more tournament game outcomes occurring.

32. The gaming system of claim 16, wherein said at least one controller, said at least one display device and said gaming machines are configured for play of the table tournament to repeat (e) to (i) a predetermined number of times.

33. The gaming system of claim 16, wherein the at least one display device is remote from the gaming machines.

34. The gaming system of claim 16, wherein the at least one display device is part of at least one of the gaming machines.

35. A gaming system comprising:

at least one controller; and a plurality of groups of gaming machines, each group including a plurality of gaming machines and each gaming machine configured to communicate with the at least one controller, wherein said at least one controller and said gaming machines are configured for each group of gaming machines for play of a table tournament to:
(a) display a total number of tournament credits for each player of one of the gaming machines of said group;
(b) enable a first player of a first one of the gaming machines of said group to place at least one wager for a tournament game using the first player's total number of tournament credits;
(c) sequentially enable the players of the other gaming machines of said group to place wagers for the tournament game using their respective total numbers of tournament credits;
(d) at any time until wagering is closed for the tournament game, for each of the gaming machines of said group, enable the player of said gaming machine to place a wager that is not indicated to the players of the other gaming machines of said group;
(e) simultaneously determine and display a same tournament game outcome for each of the players of the gaming machines of said group;
(f) determine a number of tournament credits for each player of each of the gaming machines of said group for said tournament game;
(g) display rankings of the players of the gaming machines of said group based at least in part on said determined number of tournament credits; and
(h) repeat (b) to (g) for each player of each of the gaming machines of said group with tournament credits remaining,
wherein said at least one controller and said gaming machines are configured for play of the table tournament to determine a plurality of said players of said gaming machines of said group to advance to a next round of the table tournament, wherein said plurality of players are determined independently from the groups of gaming machines.

36. The gaming system of claim 35, wherein each group of gaming machines is associated with a different gaming table.

37. The gaming system of claim 35, wherein the tournament game is selected from the group consisting of: roulette, baccarat, pai gow poker, sic bo, pai gow tiles and craps.

38. The gaming system of claim 35, wherein said at least one controller and said gaming machines are configured for each group of gaming machines for play of the table tournament to enable the players of the gaming machines of said group to place pattern wagers.

39. The gaming system of claim 35, wherein said at least one controller and said gaming machines are configured for each group of gaming machines for play of the table tournament to enable the players of the gaming machines of said group to wager non-tournament credits on at least one non-tournament game.

40. The gaming system of claim 35, wherein said at least one controller and said gaming machines are configured for each group of gaming machines for play of the table tournament to enable the players of the gaming machines of said group to wager non-tournament credits on said tournament game.

41. The gaming system of claim 35, wherein said at least one controller and said gaming machines are configured for each group of gaming machines for play of the table tournament to enable the players of the gaming machines of said group to wager non-tournament credits on at least one aspect of the table tournament.

42. The gaming system of claim 35, wherein said at least one controller and said gaming machines are configured for each group of gaming machines for play of the table tournament to display the total number of tournament credits of each player of each of the gaming machines of said group after the display of the same tournament game outcome for each of the players for a plurality of tournament games.

43. The gaming system of claim 35, wherein said at least one controller and said gaming machines are configured for each group of gaming machines for play of the table tournament to display the determined number of tournament credits of each player of each of the gaming machines of said group after the display of the same tournament game outcome for each of the players for a plurality of tournament games.

44. The gaming system of claim 35, wherein said at least one controller and said gaming machines are configured for each group of gaming machines for play of the table tournament to determine a tournament winner.

45. The gaming system of claim 44, wherein said at least one controller and said gaming machines are configured for each group of gaming machines for play of the table tournament to display a tournament award to the tournament winner.

46. The gaming system of claim 45, wherein said tournament award is selected from the group consisting of a monetary award, a physical award, an entry into a next round of the table tournament, an entry into another tournament, a quantity of tournament credits and a number of non-tournament credits.

47. The gaming system of claim 35, wherein said at least one controller and said gaming machines are configured for each group of gaming machines for play of the table tournament to enable a plurality of the players of the gaming machines of said group to place player to player wagers using non-tournament credits.

48. The gaming system of claim 35, wherein said at least one controller and said gaming machines are configured for each group of gaming machines for play of the table tournament to enable a plurality of the players of the gaming machines of said group to place player to player wagers using tournament credits.

* * * * *